US009165556B1

(12) United States Patent  (10) Patent No.: US 9,165,556 B1
Sugar et al.  (45) Date of Patent: Oct. 20, 2015

(54) METHODS AND SYSTEMS RELATED TO AUDIO DATA PROCESSING TO PROVIDE KEY PHRASE NOTIFICATION AND POTENTIAL COST ASSOCIATED WITH THE KEY PHRASE

(71) Applicant: Predictive Business Intelligence, LLC, Louisville, KY (US)

(72) Inventors: Jamie Sugar, Louisville, KY (US); Kleber Gallardo, Louisville, KY (US); Phil Williams, Louisville, KY (US)

(73) Assignee: PREDICTIVE BUSINESS INTELLIGENCE, LLC, Louisville, KY (US)

( * ) Notice: Subject to any disclaimer, the term of this patent is extended or adjusted under 35 U.S.C. 154(b) by 229 days.

(21) Appl. No.: 13/757,714

(22) Filed: Feb. 1, 2013

Related U.S. Application Data

(60) Provisional application No. 61/593,574, filed on Feb. 1, 2012.

(51) Int. Cl.
*G10L 15/00* (2013.01)
*G10L 15/04* (2013.01)
*G10L 15/10* (2006.01)
*G10L 15/08* (2006.01)

(52) U.S. Cl.
CPC .................. *G10L 15/10* (2013.01); *G10L 15/00* (2013.01); *G10L 15/08* (2013.01)

(58) Field of Classification Search
CPC .... G06F 17/2785; G10L 15/00; G10L 15/265
USPC ........................................................ 704/251
See application file for complete search history.

(56) References Cited

U.S. PATENT DOCUMENTS

| 5,369,704 | A |  | 11/1994 | Bennett et al. |
|---|---|---|---|---|
| 5,873,099 | A | * | 2/1999 | Hogan et al. ..................... 714/11 |
| 5,915,214 | A | * | 6/1999 | Reece et al. .................. 455/406 |
| 5,950,194 | A |  | 9/1999 | Bennett et al. |
| 6,064,963 | A |  | 5/2000 | Gainsboro |
| 6,301,471 | B1 | * | 10/2001 | Dahm et al. .................. 455/405 |
| 7,076,427 | B2 |  | 7/2006 | Scarano et al. |
| 7,133,828 | B2 |  | 11/2006 | Scarano et al. |
| 7,263,484 | B1 |  | 8/2007 | Cardillo et al. |
| 7,324,939 | B1 |  | 1/2008 | Cardillo et al. |
| 7,475,065 | B1 |  | 1/2009 | Cardillo et al. |
| 7,584,101 | B2 |  | 9/2009 | Mark et al. |
| 7,610,211 | B2 | * | 10/2009 | Casati et al. ................. 705/7.27 |
| 7,769,587 | B2 |  | 8/2010 | Cardillo et al. |
| 8,050,921 | B2 |  | 11/2011 | Mark et al. |
| 8,055,503 | B2 |  | 11/2011 | Scarano et al. |

(Continued)

OTHER PUBLICATIONS

Cinda Daly, The Daily Interview, May 2010, HDI Leading IT Service & Support, pp. 1-6, http://www.mcgarahan.com/images/mcgarahan2012/DI_may_pete_mcgarahan%5b1%5d.pdf.*

*Primary Examiner* — Chuong A Ngo
*Assistant Examiner* — Walter Yehl
(74) *Attorney, Agent, or Firm* — Middleton Reutlinger

(57) ABSTRACT

Methods and systems related to analyzing audio data and performing quantitative analysis and reporting related to the audio data. Audio data may be investigated and phrases of the audio data identified. In some implementations, phrases are identified based on the likelihood of an occurrence or non-occurrence of the phrase. In some implementations, phrases are identified based on a cost associated with a search phrase.

22 Claims, 18 Drawing Sheets

(56) References Cited

U.S. PATENT DOCUMENTS

| | | | |
|---|---|---|---|
| 8,825,513 B1* | 9/2014 | Misra et al. | 705/7.28 |
| 8,896,445 B2* | 11/2014 | Omiya | 340/540 |
| 2003/0154072 A1* | 8/2003 | Young et al. | 704/9 |
| 2004/0117185 A1* | 6/2004 | Scarano et al. | 704/254 |
| 2005/0114133 A1* | 5/2005 | Mark et al. | 704/251 |
| 2005/0135593 A1* | 6/2005 | Becerra et al. | 379/220.01 |
| 2007/0011008 A1 | 1/2007 | Scarano et al. | |
| 2009/0063148 A1 | 3/2009 | Straut et al. | |
| 2009/0292541 A1* | 11/2009 | Daya et al. | 704/251 |
| 2011/0004624 A1 | 1/2011 | Bansal et al. | |
| 2011/0040562 A1 | 2/2011 | Doyle et al. | |
| 2011/0125499 A1 | 5/2011 | Griggs et al. | |
| 2011/0218798 A1 | 9/2011 | Gavalda | |
| 2011/0307257 A1 | 12/2011 | Pereg et al. | |
| 2012/0239402 A1 | 9/2012 | Washio et al. | |
| 2013/0166285 A1* | 6/2013 | Chang et al. | 704/201 |
| 2013/0290074 A1* | 10/2013 | Bash et al. | 705/7.39 |

* cited by examiner

| Phrase | Action | | |
|---|---|---|---|
| cancel my account | ☑ Fail | ☑ Ignore | ☐ Delete |
| Test the second audio repository | ☑ Fail | ☑ Ignore | ☐ Delete |
| I want to stop | ☑ Fail | ☑ Ignore | ☐ Delete |
| I'd like to stop | ☑ Fail | ☑ Ignore | ☐ Delete |
| I would like to stop | ☑ Fail | ☑ Ignore | ☐ Delete |
| Can you please cancel | ☑ Fail | ☑ Ignore | ☐ Delete |
| I just cancelled my account | ☑ Fail | ☑ Ignore | ☐ Delete |
| I have cancelled my account | ☑ Fail | ☑ Ignore | ☐ Delete |
| I want to cancel my membership | ☑ Fail | ☑ Ignore | ☐ Delete |
| I'd like to cancel my membership | ☑ Fail | ☑ Ignore | ☐ Delete |

FIG. 8

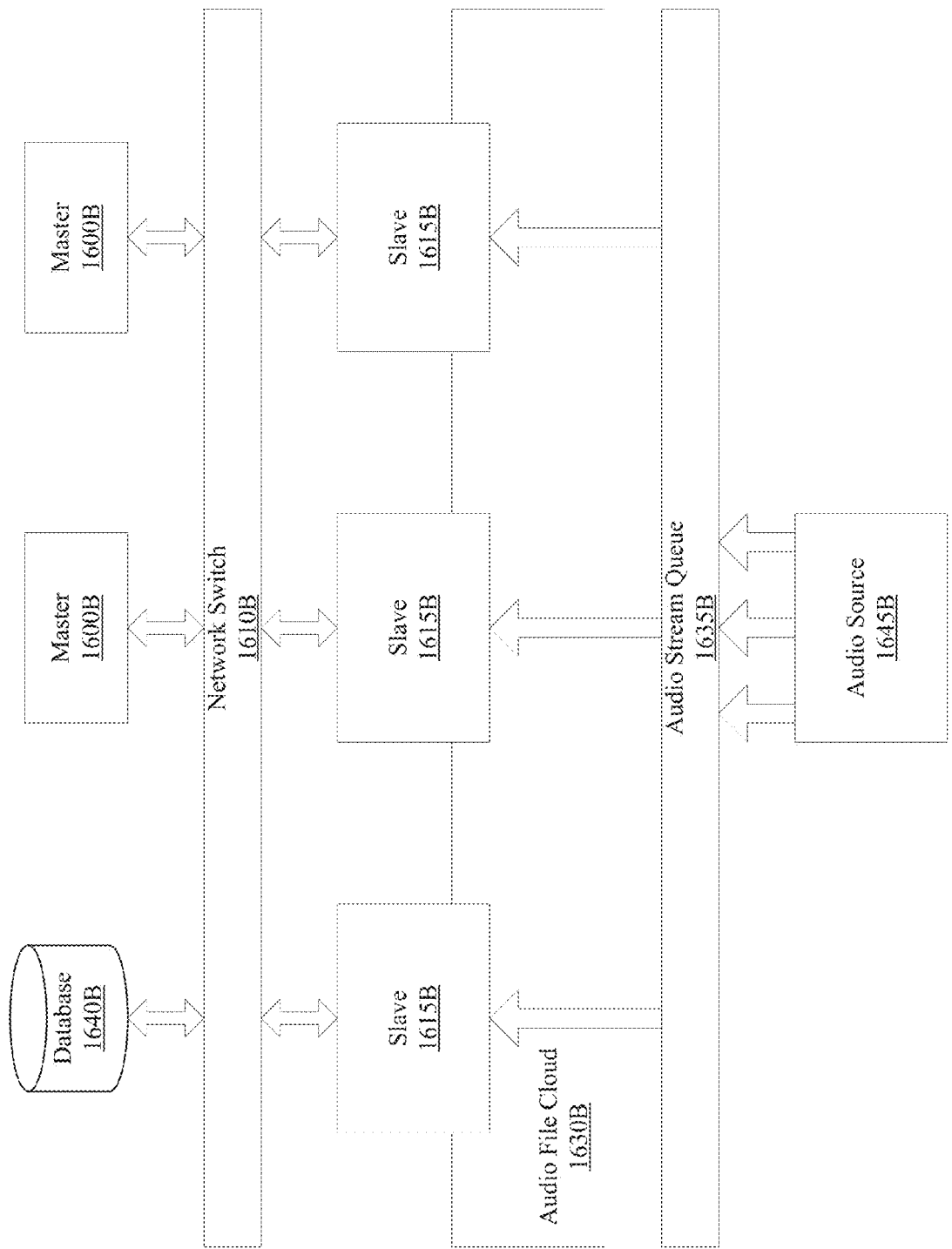

METHODS AND SYSTEMS RELATED TO AUDIO DATA PROCESSING TO PROVIDE KEY PHRASE NOTIFICATION AND POTENTIAL COST ASSOCIATED WITH THE KEY PHRASE

CROSS-REFERENCE TO RELATED DOCUMENTS

This application claims the benefit under 35 U.S.C. §119(e) of U.S. Provisional Application Ser. No. 61/593,574 filed Feb. 1, 2012 and entitled "A mechanism and a process to capture and merge structured and unstructured business data from speech and other data sources to generate quantitative analysis and reports," which is hereby incorporated by reference.

TECHNICAL FIELD

The present disclosure is directed generally to methods and systems related to audio data processing. More particularly, various inventive methods and systems disclosed herein relate to methods and apparatus for analyzing audio data and/or performing quantitative analysis and reporting related to audio data.

BACKGROUND

Many businesses utilize one or more strategies to improve customer satisfaction based on investigating customer feedback and determining the purpose and/or outcome of interactions between customers and the business. For example, a business may have a customer service telephone system in place where conversations between customers and customer service representatives are monitored and issues are identified. Such audio data may assist a business in improving a service and/or product based on feedback from customers.

SUMMARY

The present disclosure is directed generally to methods and systems related to audio data processing. More particularly, various inventive methods and systems disclosed herein relate to analyzing audio data and performing quantitative analysis and reporting related to the data.

Generally, in one aspect, a computer implemented method of analyzing content originating from an audio source is provided and includes the steps of: identifying an audio file, where the audio file is representative of spoken content of at least one speaker; identifying a key phrase, where the key phrase includes one or more words of interest; identifying a cost, where the cost is based on a value of at least one of the presence of and the absence of the key phrase in the audio file; identifying a candidate phrase in the audio file, where the candidate phrase is representative of one or more words spoken by the at least one speaker and present in the audio file; associating a confidence level with the candidate phrase, where the confidence level is based on a probability that the candidate phrase matches the key phrase; identifying a threshold confidence level; determining whether the confidence level satisfies the threshold confidence level; and providing a notification when the confidence level satisfies the threshold confidence level, the notification providing an indication of the presence of the key phrase in the audio file; where the providing of the notification is at least partially based on the cost.

Generally, in another aspect, a computer implemented method of analyzing content originating from an audio source is included and includes the step of: receiving an audio file, where the audio file is representative of spoken content of at least one speaker; identifying a key phrase, where the key phrase includes one or more words which a user has interest in identifying in the audio file; receiving a cost, where the cost is indicative of a value of at least one of the presence of and the absence of the key phrase in the audio file; identifying a candidate phrase in the audio file, where the candidate phrase is representative of one or more words spoken by the at least one speaker in the audio file and is a likely match for the key phrase; identifying a threshold cost value; determining whether the cost satisfies the threshold cost value; and providing a notification when the cost satisfies the threshold cost value, the notification providing an indication of the presence of the key phrase in the audio file.

Generally, in another aspect, a system is provided and includes: a first analysis processor, the first analysis processor operable to execute instructions stored in memory, including instructions to: receive a first audio file segment, where the first audio file segment is representative of spoken content of at least one speaker; receive a key phrase, where the key phrase includes one or more words of interest; identify a cost, where the cost is based on a value of at least one of the presence of and the absence of the key phrase in an audio source; identify a first candidate phrase in the audio file segment, where the first candidate phrase is representative of one or more words spoken by the at least one speaker and present in the audio file segment; associate a first confidence level with the first candidate phrase, where the first confidence level is based on a probability that the first candidate phrase matches the key phrase; identifying a first threshold confidence level; determine whether the first confidence level satisfies the threshold confidence level; and provide a first notification when the first confidence level satisfies the first threshold confidence level, the first notification providing an indication of the presence of the key phrase in the audio file; where the providing of the first notification is at least partially based on the cost.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 8 illustrates an example graphical user interface for selecting search terms that may be implemented in an embodiment of an audio file search engine.

FIG. 16B is a block diagram illustrating an example environment of a system for analyzing audio data utilizing cloud computing.

DETAILED DESCRIPTION

Figure 1:
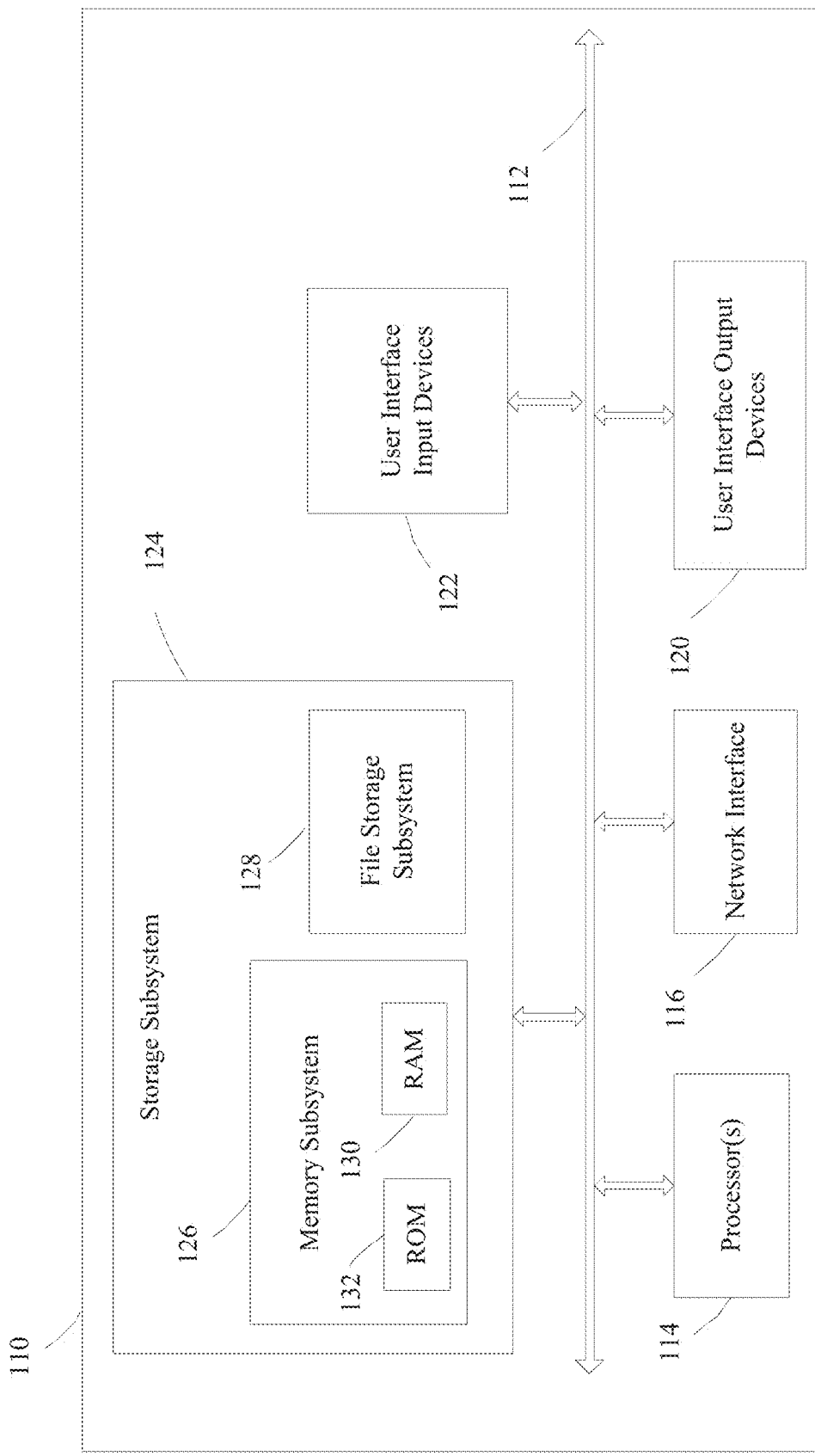
FIG. 1 is a block diagram of an example computer system.

Referring to FIG. 1, a block diagram of an example computer system 110 is provided. Computer system 110 typically includes at least one processor 114 which communicates with a number of peripheral devices via bus subsystem 112. These peripheral devices may include a storage subsystem 124, including, for example, a memory subsystem 126 and a file storage subsystem 128, user interface input devices 122, user interface output devices 120, and a network interface subsystem 116. The input and output devices allow user interaction with computer system 110. Network interface subsystem 116 provides an interface to outside networks and is coupled to corresponding interface devices in other computer systems.

User interface input devices 122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 110 or onto a communication network.

User interface output devices 120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 110 to the user or to another machine or computer system.

Storage subsystem 124 stores programming and data constructs that provide the functionality of some or all of the modules described herein. For example, the storage subsystem 124 may include the logic to process an audio file, search an audio for the presence of one or more terms, analyze audio file search result, and/or display audio file search results according to one or more processes described herein.

These software modules are generally executed by processor 114 alone or in combination with other processors. Memory 126 used in the storage subsystem can include a number of memories including a main random access memory (RAM) 130 for storage of instructions and data during program execution and a read only memory (ROM) 132 in which fixed instructions are stored. A file storage subsystem 128 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 128 in the storage subsystem 124, or in other machines accessible by the processor(s) 114.

Bus subsystem 112 provides a mechanism for letting the various components and subsystems of computer system 110 communicate with each other as intended. Although bus subsystem 112 is shown schematically as a single bus, alternative implementations of the bus subsystem may use multiple busses.

Computer system 110 can be of varying types including a workstation, server, computing cluster, blade server, server farm, or any other data processing system or computing device. Due to the ever-changing nature of computers and networks, the description of computer system 110 depicted in FIG. 1 is intended only as a specific example for purposes of illustrating some implementations. Many other configurations of computer system 110 are possible having more or fewer components than the computer system depicted in FIG. 1.

Figure 2:
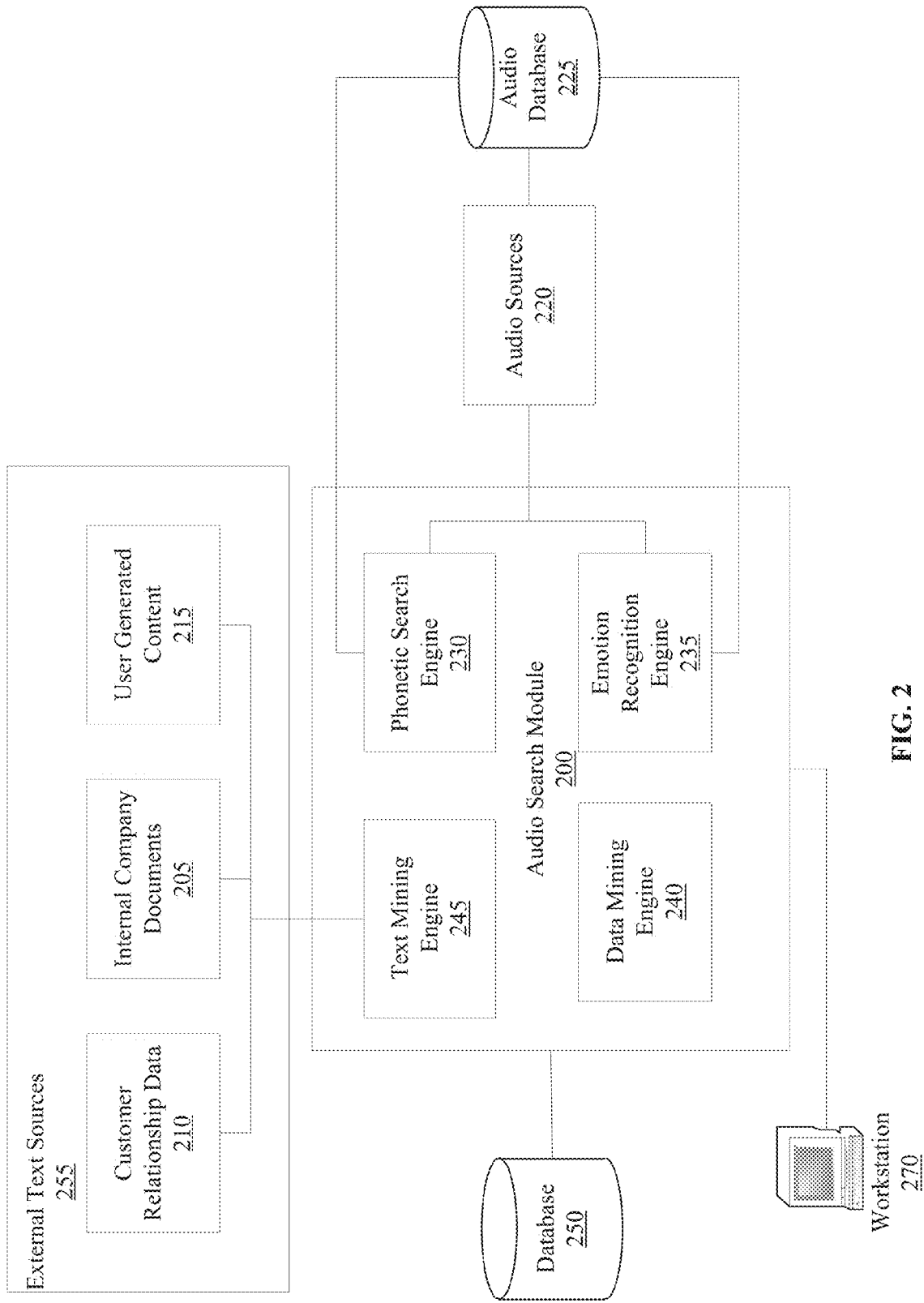
FIG. 2 is a block diagram illustrating an example environment of a system for analyzing data from speech and other sources to generate quantitative analysis and reports.

Referring to FIG. 2, a block diagram illustrating an example environment of a system for analyzing data from speech and other sources to generate quantitative analysis and reports is provided. Audio search module 200 may share one or more aspects with one or components of the computer architecture as illustrated in FIG. 1. Audio search module 200 may perform one or more steps in the flowcharts illustrated in FIGS. 3 through 7 and described herein. In the illustrated environment, initial data to populate the system is received from one or more sources. In some implementations, initial company data may originate from one or more external text sources 255 which may include customer relationship data 210, internal company documents 205, and/or user generated content 215. In some implementations, additional and/or alternate text sources may be utilized by the system. Internal company documents 205 may be comprised of, for example, company text documents, company websites, and/or one or more resources from within a company. User generated content 215 may be comprised of one or more dynamic sources, such as TWITTER, FACEBOOK, text messages, data received via BLUETOOTH, and/or input via the Internet, such as from a text form on a website and/or user comments on a blog and/or an online forum. For example, a company may have a website with a user comments page, which a user may utilize to submit feedback and/or a company may have a user forum to allow users to post comments and/or complaints about the company. Text mining engine 245 may use one or more external text sources 255 to generate potential key phrases for later analysis.

Audio source 220 may include data which is received via an audio network, such as a telephone network. Audio files from audio source 220 may be stored directly in audio database 225 and/or audio files may be received directly by audio search module 200 for analysis in real time. Audio search module 200 may additionally and/or alternatively retrieve audio files from audio database 225 for analysis. Audio files received directly from audio source 220 and/or audio files retrieved from audio database 225 may be analyzed by one or more components and/or modules of audio search module 200, such as phonetic search engine 230 and/or emotional recognition engine 235. Audio files and/or data files derived from one or more audio files stored in audio database 225 and/or audio files and/or data derived from one or more audio files received directly by audio search module 200 may be utilized in future searches to locate potential key phrases in the audio files. In some implementations, database 225 may store metadata associated with an audio file and/or an audio file segment. In some implementations, the metadata may include one or more determined characteristics of the audio file such as, for example, date when the audio file was recorded, telephone number and/or account number of a customer in a recording, and/or length of an audio file. In some implementations, audio database 225 may be a remote database and/or may utilize cloud computing to store and/or retrieve audio files. In some implementations, multiple audio databases may work in conjunction to store one or more aspects of audio files. For example, one or more databases may be utilized to store metadata associated with audio files, such as timestamps, speaker identification information, and/or analysis results provided by phonetic search engine 230, emotion recognition engine 235, and/or phrase search results from previous searches. One or more separate databases may store the audio files received by audio sources 220 and/or a compressed or manipulated version of an audio stream received by audio sources 220. For example, a phone conversation may be recorded as an MP3 file, stored in audio database 225, and later accessed by audio search module 200, phonetic search engine 230, and/or emotional recognition engine 235 for further analysis. In some implementations, audio files may be initially processed and/or analyzed for search terms utilizing an environment which shares one or more characteristics the environment illustrated in FIG. 16.

One or more phrases from one or more external text sources 255 may be directed to text mining engine 245 for further analysis. Text mining engine 245 may analyze the content of text sources, the purpose for creating of one or more text sources, and/or the result of interactions with customers recorded in text sources. Text mining engine 245 may further associate a cost with one or more phrases identified in external text sources 255. A cost may be associated with a phrase to reflect the importance of an instance where that phrase is mentioned. In some implementations, the cost associated with a phrase may be related to a monetary cost which may be incurred and/or gained when the associated phrase is mentioned in an audio file. For example, user generated content 215 may contain a posting by a customer on a company's FACEBOOK page. Multiple customers may use the phrase "I'm not satisfied" in a posting, and text mining engine 245 may determine that the phrase "I'm not satisfied" is important and should be flagged as a phrase that should be used as a search term in audio files containing conversations between company representative and customers. In some implementations, text mining engine 245 may further associate a cost with the phrase based on additional information from one or more sources. As another example, an internal document 205 may be generated by a customer service representative based on a customer canceling a subscription to services. Text mining engine 245 may discover the proximity of the words "cancel" and "subscription" in the internal document 205 and use those two words as key phrases in future searches of audio files.

Text mining engine 245 may further additionally and/or alternatively associate a cost with a key phrase based on metadata associated with a particular text document. For example, a company budget may be received by text mining engine 245 to search for possible key phrases. Text mining engine 245 may associate the phrase "canceled subscriptions" with a corresponding cost (e.g., a monthly cost, an annual cost, the cost associated with the remainder of the term of the cancelled subscription). Searches of audio files may allow a company to assess budgetary needs based on real monetary values associated with key phrases. Identified phrases from external text sources 255 may be transmitted from text mining engine 210 to audio search module 200 in the form of a search tree and/or other pertinent form which may be utilized by audio search module 202 to associate the relevancy of one or more identified phrases based on the occurrence of individual phrases, the co-occurrence of two or more phrases in proximity, and/or the non-occurrence of one or more phrases. In some implementations, a cost may be associated with the occurrence and/or non-occurrence of one or more phrases. In some implementations a cost may be associated with the occurrence and/or non-occurrence of one or more phrases in a group of two or more phrases. Associations between one or more potential search phrases may further assist a user and/or audio search module 200 in future searches of audio files.

Database 250 may store analysis results from text mining engine 245, phonetic search engine 230, emotion recognition engine 235, data mining engine 240, audio search module 200, and/or raw data received from external text sources 255 and/or audio sources 220. In some implementations, audio search module 200 may access data stored in database 250 for further analysis and/or to perform searches on audio files using identified phrases. In some implementations, audio search module 200 may transmit audio search results to database 250 for later display and/or further analysis. Database 250 may be comprised of multiple databases, may be located locally, and/or may be accessible remotely via network communication and/or cloud computing.

In some implementations, text files from customer relationship management data 210, internal company documents 205, and/or user generated content 215 may be processed by one or more additional tools before data is sent to audio search module 200 and/or text mining engine 245. For example, user generated content 220 may be transmitted to a system management agent (SMA) tool to transform content from various sources into a uniform format for analysis by audio search module 200 and/or text mining engine 210. SMA tool 215 may mine data from sources utilizing one or more user generated protocols for potential search terms present in those sources. Customer relationship data 210 may be organized by a customer relationship management application to mine files for potential search phrases and manage documents related to a company's interactions with past, current and future customers. A customer relationship management application may organize, automate, and/or synchronize information from one or more sources, such as written complaints from customers, notes generated by a customer service representative while speaking with a customer, and/or emails sent by customers to the company. Text mining engine 245 may further analyze data generated by an SMA tool and/or customer relationship management application in order to generate descriptive and/or predictive data mining models.

Data mining engine 240 may be utilized to further analyze data generated by text mining engine 245, data stored in database 250, search results received from audio search module 200, and/or text from external text sources 255. Data mining engine 240 may receive "hard" data from the sources and generate descriptive and/or predictive data models based on the frequency of phrases in documents, the purpose of one or more documents, and/or customer service representative notations in one or more documents.

Phonetic search engine 230 may be utilized by audio search module 200 to analyze audio sources 220 and/or audio database 225. In some implementations phonetic search engine 230 may process an audio file into a format which, in some implementations, is more easily searched for key terms and phrases. For example, phonetic search engine 230 may transcribe the contents of an audio file into a text file so that individual terms may be extracted. In some implementations, phonetic search engine 230 may perform further analysis on audio files to extract potential key phrases to be used in later analysis of additional audio files. For example, phonetic search engine 230 may encounter the phrase "I'd like to cancel my account" multiple times in one or more audio files. Phonetic search engine 230 may determine that the phrase "I'd like to cancel my account" is important and suggest to audio search module 200 to use that phrase as a search term in future searches of audio files from audio sources 220 and/or audio database 225. Results of analysis by phonetic search engine 230 may be transmitted to audio database 225 and/or database 250 for storage. In some implementations, metadata generated by phonetic search engine 230 may be transmitted to a separate database for storage.

Emotion recognition engine 235 may be utilized to analyze one or more audio files generated by audio sources 220 and/or one or more audio files stored in audio database 225. Emotion recognition engine 235 may analyze the voice of a speaker on an audio file and identify potential emotions of the speaker based on one or more characteristics of the voice such as, for example: language used, volume of the speaker's voice, speed of the speaker's speech patterns, and/or inflection in the speaker's voice. In some implementations, emotion recognition engine 235 may identify the emotion of a speaker and an associated confidence level that the speaker is experiencing the suggested emotion. In some implementations, emotion recognition engine 235 may suggest multiple potential emotions with corresponding confidence levels. Results of analysis by emotion recognition engine 235 may be transmitted to audio database 225 and/or database 250 for storage. In some implementations, metadata generated by emotion recognition engine 235 may be transmitted to a separate database for storage.

A user may interact with audio search module 200 via workstation 270. In some implementations, workstation 270 may display one or more of the graphical user interfaces (GUIs) illustrated in FIGS. 9 through 15 and described herein. In some implementations a user may interact with audio search module 200 using workstation 270 to, for example: input one or more key phrases of interest which the user would like to locate in an audio file; alter and/or delete key phrases of interest which the audio search module 200 has generated; view search results generated by audio search module 200 from searches executed on one or more audio files; and/or access one or more audio files for further analysis. In some implementations, one or more additional workstations 270 may be present and may accommodate multiple users of the audio search module 200. In some implementations, the user of workstation 270 may be limited in accessible functionality based on a user's permissions. For example, a manager may have access to interfaces which allow a user to edit and/or delete potential search phrases. A customer service representative may have limited access to one or more interfaces displays to limit allowable alterations to audio search module 200.

Audio search module 200 processes data received from external text sources 255, audio sources 220, workstation 270, and/or one or more additional databases and determines one or more key phrases of interest to locate in audio files. In some implementations, audio search module 200 will analyze sources utilizing text mining engine 245, data mining engine 240, phonetic search engine 230, and/or emotion recognition engine 235 to identify one or more key search terms or phrases for utilization in further analysis of audio files. For example, audio search module 200 may receive an indication from text mining engine 245 that the phrase "I'd like to cancel my subscription" appears regularly in one or more external documents. Audio search module 200 may flag the phrase "I'd like to cancel my subscription" as a potentially important phrase and subsequently search future audio files and/or previously recorded audio files stored in audio database 225 and/or database 250 for the phrase "I'd like to cancel my subscription" to locate other occurrences of the phrase in one or more audio files. Additionally or alternatively, audio search module 200 may utilize data from one or more additional components in order to make adjustments to one or more characteristics of a phrase to increase the effectiveness of future searches. For example, audio search module 200 may execute a search on an audio file, determine that the search identified the non-occurrence of a search phrase, and adjust the confidence level associated with the search phrase for use in future audio file searches. In some implementations, a user may access audio search module 200 via workstation 270 and manually edit one or more search phrases, input additional search phrases, and/or delete potential key search phrases which have been erroneously identified by audio search module 200 as pertinent.

Audio search module 200 may categorize one or more key phrases into broader categories based on identifications made by text mining engine 245, data mining engine 240, emotion recognition engine 235, and/or phonetic search engine 230. A category may be associated with one or more terms which are broadly related to each other. For example, a category may be named "Cancellation Reasons" and that category may be associated with terms such as "I cannot afford it," "credit card issues," and/or "I lost my job." One or more phrases may optionally be categorized based on terms. For example, the phrases "We will send the monthly pass to you in time," "We can mail a monthly pass to you," and/or "We will get monthly pass mailed to you in time" may be associated with the term "Get monthly pass mailed in time" based on the presence and/or proximity of one or more words and/or phrases (e.g., "monthly," "pass," "time," "monthly pass"). Additionally, for example, "Get monthly pass mailed in time" may be associated with the broader category "Customer Service." One or more terms and/or categories may be utilized by audio search module 200 to search audio files for multiple phrases without the need to select phrases of interest individually. For example, the category "Cancellation Reasons" may be identified as a search input. Audio search module 200 may search one or more audio files based on phrases associated with terms associated with the category "Cancellation Reasons," ("Get monthly pass mailed in time," "We will send the monthly pass to you in time," "We can mail a monthly pass to you." In some implementations, audio search module 200 may recognize broader categories based on information determined by one or more analysis engines and may automatically associate a phrase with an existing category and/or term. In some implementations, audio search module 200 may create one or more new categories and/or terms based on suggestions from one or more engines. For example, data mining engine 240 may determine that text files which contain "cancel" and "subscription" were often generated in response to a customer requesting the cancellation of one or more services and the one or more text files containing those phrases also contained information regarding the reasons why a customer decided to cancel the services. In that case, audio search module 200 may associate the phrase "I'd like to cancel my subscription" with a category entitled "Cancellation Reasons." One or more additional phrases may subsequently be associated with the category "Cancellation Reasons" as suggested by an analysis engine. For example, "I would like to stop" may also be associated with the category "Cancellation Reasons." In some implementations, a user of workstation 270 may manually associate or disassociate one or more phrases with a category. In some implementations, a workstation 270 may utilize display interfaces which may share one or more characteristics with the graphical user interfaces illustrated in FIGS. 8 through 10 and described herein.

Audio search module 200 may utilize analysis from one or more analysis engines in order to assign a cost to a suggested key phrase. An associated cost may reflect a monetary cost which may be incurred when a given phrase is located or is absent from an audio file. In some implementations, associated cost may reflect the importance of an audio file where the associated key phrase is located. For example, a cost of $19.99 may be associated with a phrase categorized in the "Cancellation Reasons" category. The cost may be the monetary value of a customer's subscription to the company's services and, if an audio file contains a phrase in the category "Cancellation Reasons," an audio file reflecting a customer canceling services may be utilized to adjust a budget for the company. In some implementations, an associated cost may be determined based on a status and/or characteristic of a customer. For example, a cost may be based on the value of a customer's business to a company. A company may incur a significant loss if a valued customer cancels a service, so a larger cost may be associated with one or more phrases based on the status of the customer in an audio file. Also, for example, an associated cost for one phrase may vary based on the customer. A customer who has a higher monthly subscription cost may have a larger cost associated with a phrase than a customer with a lower monthly subscription cost. In some implementations, a cost may reflect the importance of flagging an audio file for further analysis when a particular phrase is present or not present in the audio file. For example, the phrase "I'm angry" may be very important to a company because a supervisor would be interested in listening to the reason or reasons why customer is angry. Audio search module 200 may assign the phrase "I'm angry" with a high cost value so that an audio file containing that phrase is more likely to trigger a subsequent modification to a supervisor. In some implementations, audio search module 200 may adjust a cost assigned to a phrase based on historic evidence of results of audio file searches. For example, data mining engine 240 may determine that cancellations occur in 50% of files which contain the phrase "I'd like to cancel." Initially, audio search module 200 may assign a cost of $19.99 to the phrase, but after analysis and results of one or more subsequent audio files, the cost may be adjusted to $9.99 to reflect the average cost when files contain the phrase "I'd like to cancel." In some implementations, the particular cost associated with a phrase may be based on attributes that are unique to the particular customer that spoke the phrase. For example, an associated cost may be based on how many times a customer has called within a time period. Additionally or alternatively, for example, a cost may be adjusted based on an identified emotion of a speaker. For example, a higher cost may be associated with a given phrase that is identified in a call of a customer who mentions the given phrase and is identified as an angry customer than if the same given phrase is identified in a call of a customer who is not angry. Additionally, for example, a phrase that is mentioned multiple times in a call may be assigned a higher cost to reflect the potential importance of the phrase. The costs in later audio file searches associated with a given phrase may be adjusted based on a particular user just when analyzing audio data of that particular user and/or may be adjusted for all later searches to reflect a new indication of the importance of the phrase in identifying instances where the phrase is spoken.

Phonetic search engine 230 may be utilized to search one or more audio sources 220 and/or one or more audio files saved in audio database 225. Phonetic search engine 230 may scan one or more audio streams and/or audio files for a particular phrase or phrases received from audio search module 200 and/or audio database 225. In some implementations, audio search module 200 may associate a threshold probability value to one or more phrases. Phonetic search engine 230 may search one or more audio files and/or streams and flag instances in the audio file where the likelihood that the audio file contains the phrases of interest exceeds a minimum threshold probability. For example, audio search module 200 may request that the phrase "I'd like to cancel my subscription" be located in a given set of audio files. Phonetic search engine 230 may phonetically search the audio files and flag any position in the audio files where phonetic search engine 230 is at least 95% confident that the phrase is present. In some implementations, phonetic search engine 230 may provide a notification that an audio file contains the phrase without indicating where in the audio file the phrase is located. In some implementations, audio search module 200 may utilize a notification from phonetic search engine 230 to trigger one or more additional events, such as associating the audio file with a pre-defined category and/or term. In some implementations, audio search module 200 may only trigger a notification when a cost associated with a phrase exceeds a threshold. For example, a cost of $0.50 may be associated with the phrase "I'd like to change my service." If $0.50 is below a threshold value for cost, the phrase is less likely to be located in an audio file than if $0.50 were above the threshold value and/or if a greater cost was associated with the same phrase. A notification may be less likely to be sent based on a lower associated cost than an identification of the same phrase with a higher associated cost. Additionally or alternatively, an audio file may contain a reference to a component of a service which is of minimal value. Audio search module 200 may not flag the audio file for further investigation unless the cost of the component is above a critical value. For example, a service may have an additional feature with one version that is an additional $1.99, while another version of the feature costs $19.99. A phrase containing the name of the service may have a larger cost associated with the phrase when a customer has the more expensive version of the service, making it more likely that a potential match will be located in an audio file.

Phonetic search engine 230 may transmit information regarding the location of one or more phrases in a set of audio files to audio search module 200 for further analysis. In some implementations, one or more further events may be triggered by the likely presence of a phrase in an audio file. For example, an audio file may be flagged for further analysis by a supervisor when a phrase categorized as a complaint is likely present in the audio file. In some implementations an audio file may be flagged for further analysis when one or more phrases is absent from an audio file. In some implementations, an audio file may contain two or more phrases of interest, but an event may be triggered only when two or more of the multiple phrases are located within a specified time frame. For example, an audio file may be flagged when the word "dislike" and the name of the company are found in the same audio file. Also, for example, the audio file may only be flagged when the word "dislike" and the name of a company of interest are found in the same audio phrase and co-occurring within a 15-second time interval. Also, for example, the audio file may only be flagged when one or more of the words "dislike", "unhappy", or "upset" and the name of the company of interest are found in the same audio phrase and co-occurring within a 15-second time interval. Additionally or alternatively, a user may have an interest in the co-occurrence of multiple phrases of interest, the occurrence of one phrase of interest and non-occurrence of a second phrase of interest, and/or the non-occurrence of multiple phrases of interest. For example, an audio file which does not contain an instance of the phrase "Your call may be recorded" disclaimer may be flagged. Also, for example, an audio file may be flagged if a phrase is identified that relates to a customer cancelling an account and a customer service representative does not mention the phrase "We value your business."

Figure 16A:
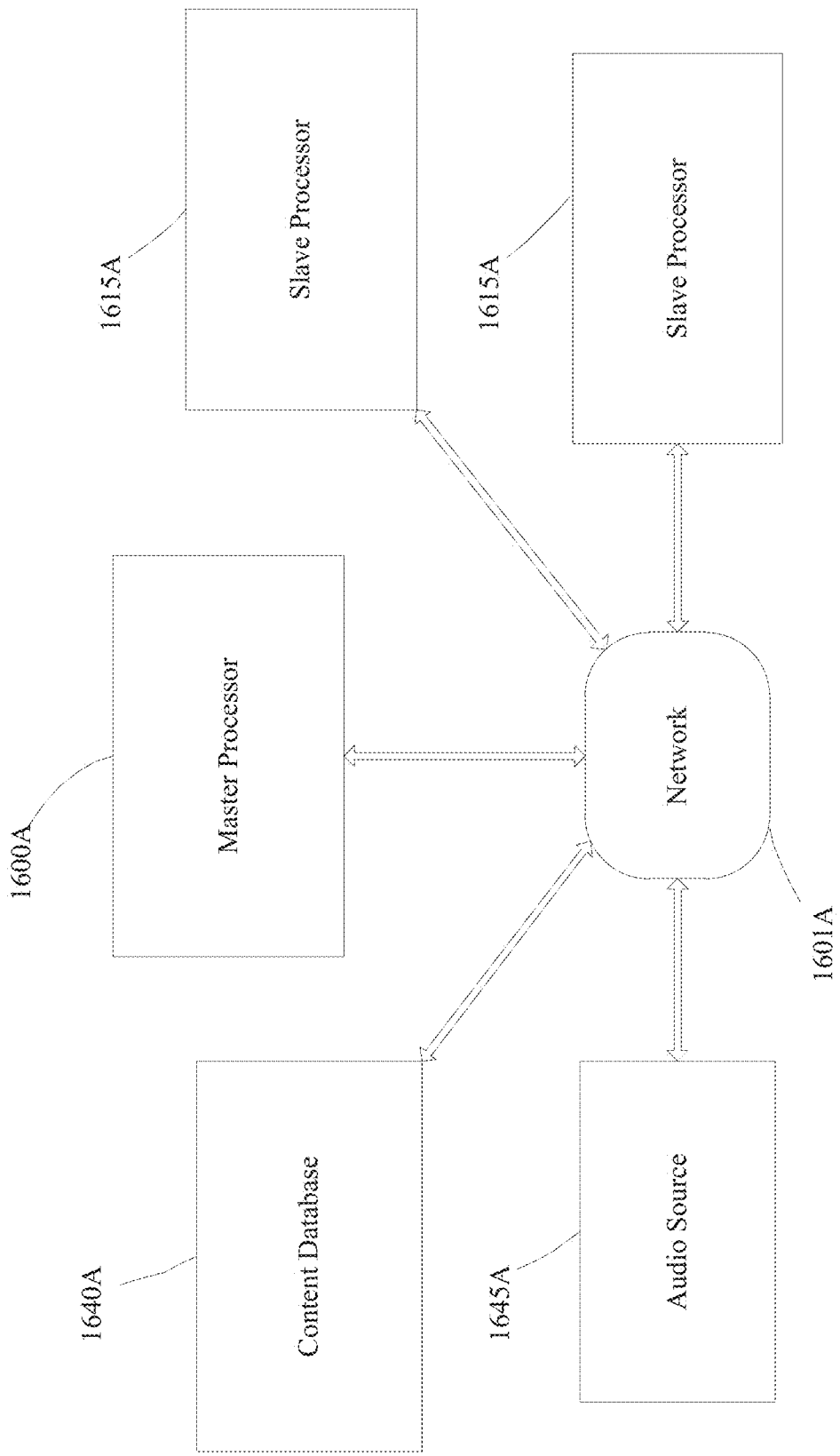
FIG. 16A is a block diagram illustrating an example of a scalable distributed computing environment for processing audio data.

Referring FIG. 16A, a block diagram illustrating an example of a scalable distributed computing environment for processing audio data is provided. The communication network 1601A facilitates communication between the various components in the environment. In some implementations the communication network 1601A may include the Internet, one or more intranets, and/or one or more bus subsystems. The communication network 1601A may optionally utilize one or more standard communications technologies, protocols, and/or inter-process communication techniques.

In the illustrated environment, audio source 1645A may receive streaming audio via a telephonic communication device, such as a landline telephone, through cellular communication, and/or communication network 1601A. In some implementations, additional audio sources may be utilized to handle streaming audio data generated from incoming calls. Incoming audio streams may be transmitted to one or more slave processors 1615A, master processor 1600A, and/or content database 1640A. Audio source 1645B may share one or more characteristics with audio sources 220 of FIG. 2. In some implementations, audio streams received from audio source 1645A may first be processed by one or more slave processors 1615A and/or one or more master processor 1600A. In some implementations, audio streams from audio source 1645B may be immediately processed by one or more slave processors, processed by one or more master processors 1600A, and/or stored in database 1640A by one or more processor. In some implementations, content database 1640A may share one or more aspects with audio database 225, database 250, and/or database 1640B.

Master processor 1600A may schedule and coordinate processing tasks for distribution to one or more slave processors. Some systems may include multiple master processors in communication with each other. In some implementations, one master processor 1600A may be a primary master processor and one or more additional master processors may be secondary master processors and utilized when one or more master processors is offline and/or the processing load on one or more master processors reaches a threshold. In some implementations, multiple master processors 1600A may be in communication and jointly coordinating task distributions to one or more slave processors 1615A. Master processor 1600A may assign computing jobs to one or more slave processors 1615A. In some implementations, one or more master processors 1600A may receive notifications from audio source 1645A via communication network 1601A that one or more audio streams require processing and instruct one or more slave processors 1615A to begin processing the streams. Additionally or alternatively, master processors 1600A may receive analysis and/or processing results from one or more slave processors 1615A.

In the illustrated environment, the system includes two slave processors 1615A. Some systems may utilize additional and/or fewer slave processors to process, phonetically translate, index, and/or store audio data and/or metadata associated with audio data received from audio source 1645A via communication network 1601A. In some implementations, a system may include multiple slave processors 1615A and may vary the number of utilized slave processors depending on a computing load to efficiently maintain consistent processing speed. In some implementations, one or more master processors 1600A may estimate the number of slave processors to utilize based on calculating a load value. In some implementations the load value may be based on one or more factors, such as expected volume of incoming audio streams, historical audio stream volume, density of incoming audio streams, the time of day (e.g., certain times of day may typically see increased call traffic for a call center), day of the week, date of the year, speed and/or capabilities of master and/or slave processors, and/or other factors to indicate the number of slave processors needed to phonetically translate, process, search, index, and/or store audio files. Master processor 1600A may add additional slave processors 1615A when a load value exceeds a processing threshold and remove slave processors 1615A when a load value is below a processing threshold. For example, one slave processor may process 10 audio streams simultaneously at speed which satisfies a threshold speed. A master processor may add a second slave processor 1615A if the density of incoming calls increases to 11 and the speed for a single slave to process the audio streams no longer satisfies the threshold speed.

Slave processors 1615A may process one or more audio streams, search audio files and/or audio streams for phrase occurrences, and/or store audio files. In some implementations, a slave processor 1615A may perform one or more methods illustrated in FIGS. 3 through 7 and described herein. Master processor 1600A may assign one or more slave processors 1615A a task, such as searching an audio file and/or audio stream to identify one or more phrases and/or processing an audio stream to prepare the stream for storage in content database 1640A. A slave processor 1615 may be instructed by master processor 1600A to begin or cease processing and/or searching audio files based on a current and/or predicted load value for the system. In other implementations, audio files may be saved in content database 1640A and master processors 1600A may direct one or more slave processors 1650A to retrieve an audio file from content database 1640A and perform one or more tasks utilizing the file. In some implementations, slave processors 1615A may share one or more aspects with slave processors 1615B.

Content database 1640A may store audio files and/or data files derived from one or more audio streams by one or more slave processors 1615A and/or master processor 1600A. In some implementations, content database 1640A may additionally and/or alternatively store metadata associated with an audio file. In some implementations, the metadata may include one or more determined characteristics of the audio file such as, for example, date when the audio file was recorded, telephone number and/or account number of a customer in a recording, length of an audio file, location of an audio file in memory, and/or search results from one or more phrase searches on the audio file. In some implementations, content database 1640A may be a remote database and/or may utilize cloud computing to store and/or retrieve audio files. In some implementations, multiple content databases may work in conjunction to store one or more aspects of audio files. For example, one or more databases may be utilized to store metadata associated with audio files, such as timestamps, speaker identification information, and/or phrase search results. In some implementations, content database 1640A may share one or more aspects with database 250, audio database 225, and/or content database 1640B.

Many other configurations are possible having more or less components than the environment shown in FIG. 16A. For example, although two slave processors 1615A are illustrated in FIG. 16, it is understood that in some environments additional and/or fewer slave processors may be present in some implementations. Also, for example, some implementations may include additional master processors. Also, for example, in some environments audio source may be omitted and audio processing may be performed on audio files provided by content database 1640A. Also, for example, in some environments one or more of the components may be combined.

Referring to FIG. 16B, a block diagram illustrating an example environment of a system for analyzing audio data utilizing cloud computing is provided. In some implementations, a system environment may include one or more additional components and/or one or more components depicted in FIG. 16B may share one or more characteristics with components of the computer architectures illustrated in FIGS. 1, 2, and/or 16A. In the illustrated environment, audio source 1645B may receive audio via a telephonic communication device, such as a landline telephone, telephone switches, through cellular communication, computer network communication, and/or voice over IP. In some implementations, additional audio sources may be utilized to handle streaming audio data generated from incoming calls. Audio stream queue 1635B may receive audio streams from audio source 1645 and prepare incoming audio streams for distribution to one or more slave processors. Audio source 1645B may share one or more characteristics with audio sources 220 of FIG. 2. In some implementations, audio streams received from audio source 1645B may first be processed by one or more modules illustrated in FIG. 2. For example, phonetic search engine 230 may first receive audio streams from audio source 1645B and digitally transcribe conversations in the audio stream. In some implementations, audio stream queue 1635B may receive digital representations of analog audio initially received from audio source 1645B. Audio stream queue 1635B may organize incoming audio streams from audio source 1645B and facilitate routing audio streams to one or more slaves for further analysis. In the illustrated environment, audio file cloud 1630B may be utilized to store audio files in preparation for later routing to one or more slave processors. In some implementations, audio files and associated metadata may be stored in audio file cloud 1630B in a distributed and balanced manner in order to improve efficiency in audio processing. In some implementations, audio streams from audio source 1645B may be directed to network switch 1610B. In some implementations, audio streams from audio source 1645B may be directly transmitted to audio file cloud 1630B. Audio streams from audio source 1645B may be held in audio stream queue 1635B, stored in audio file cloud 1630B, immediately processed by one or more slave processors, transferred directly to network switch 1610B and processed by one or more master processors, and/or stored in database 1640B by one or more processor. In some implementations, database 1640B may share one or more aspects with audio database 225 and/or database 250.

Audio stream data from audio source 1645B may be accessible to one or more slave processors 1615B via audio file cloud 1630B. Three slave processors are depicted in FIG. 16B, but other implementations may include any number of slave processors based on load value and/or capabilities of the system. For example, a system where thousands of audio files are processed daily may include additional slave processors compared to a system which may process fewer than one hundred calls per day. Slave processors 1615B may execute one or more methods to phonetically search, translate, index, and/or store one or more audio streams, audio files, and/or audio file fragments. Slave processors 1615B may receive audio stream data from audio stream queue 1635B and/or from audio source 1645B via a network switch 1610B and/or through audio file cloud 1630B. Slave processors 1615B may perform a search on one or more audio files and or audio file fragments for the occurrence of one or more phrases utilizing methods which may share one or more characteristics with the methods illustrated in FIGS. 3 through 7 and described herein.

One or more master processors 1600B may communicate with slave processors 1615B via a network switch 1610B. The system depicted in FIG. 16 illustrates two master processors 1600B. Other systems may include additional or fewer master processors 1600B. In some implementations, one master processor 1600B may be a primary master processor and one or more additional master processors may be utilized as a secondary master processor when the primary master processor is offline and/or the processing load on one or more primary master processors reaches a threshold. In some implementations, multiple master processors 1600B may be in communication and jointly coordinating task distributions to one or more slave processors 1615B. Master processor 1600B may assign computing jobs to one or more slave processors 1615B. In some implementations, master processor 1600B may maintain metadata associated with audio files residing in audio file cloud 1630B and/or audio files processed by one or more slave processors 1615B. In some implementations, one or more master processors 1600B may receive notifications from audio stream queue 1635B that one or more audio files require processing. For example, a telephone call may be initiated and directed to audio source 1645B, which may relay the audio stream to audio stream queue 1635B. Master processor 1600B may receive a notification that an audio file is waiting in audio stream queue 1635B and instruct one or more slave processors 1615B to retrieve the waiting audio file and begin processing the file. Additionally or alternatively, master processors 1600B may receive analysis and/or processing results from one or more slave processors 1615B. In some implementations, master processor 1600B may access one or more audio files and divide a file into smaller fragments and instruct one or more slave processors 1615B to further process the fragments. For example, master processor 1600B may receive an audio file which is 300 megabytes. Master processor may split the audio file into three smaller segments of 100 megabytes each and transmit the first segment to the first slave processor 1615B, the second segment to the second slave processor, and the last segment to the third slave processor. Each slave processor may perform one or more methods using a segment of the audio file and transmit audio search results to master processor 1600B for further processing. Additionally or alternatively, master processor 1600B may instruct one or more slave processors 1615B to fragment one or more audio files for further processing by one or more additional slave processors 1615B.

In some implementations, slave processors 1615B may process audio files and/or perform searches of audio files in real time. Master processor 1600B may assign one or more slave processors 1615B to perform a search on an audio file and/or audio stream as it is being relayed to the slave processor 1651B. In other implementations, audio files may be saved in database 1640B and master processors 1600B may instruct one or more slave processors 1615B to retrieve an audio file from database 1640B at a later time.

Figure 3:
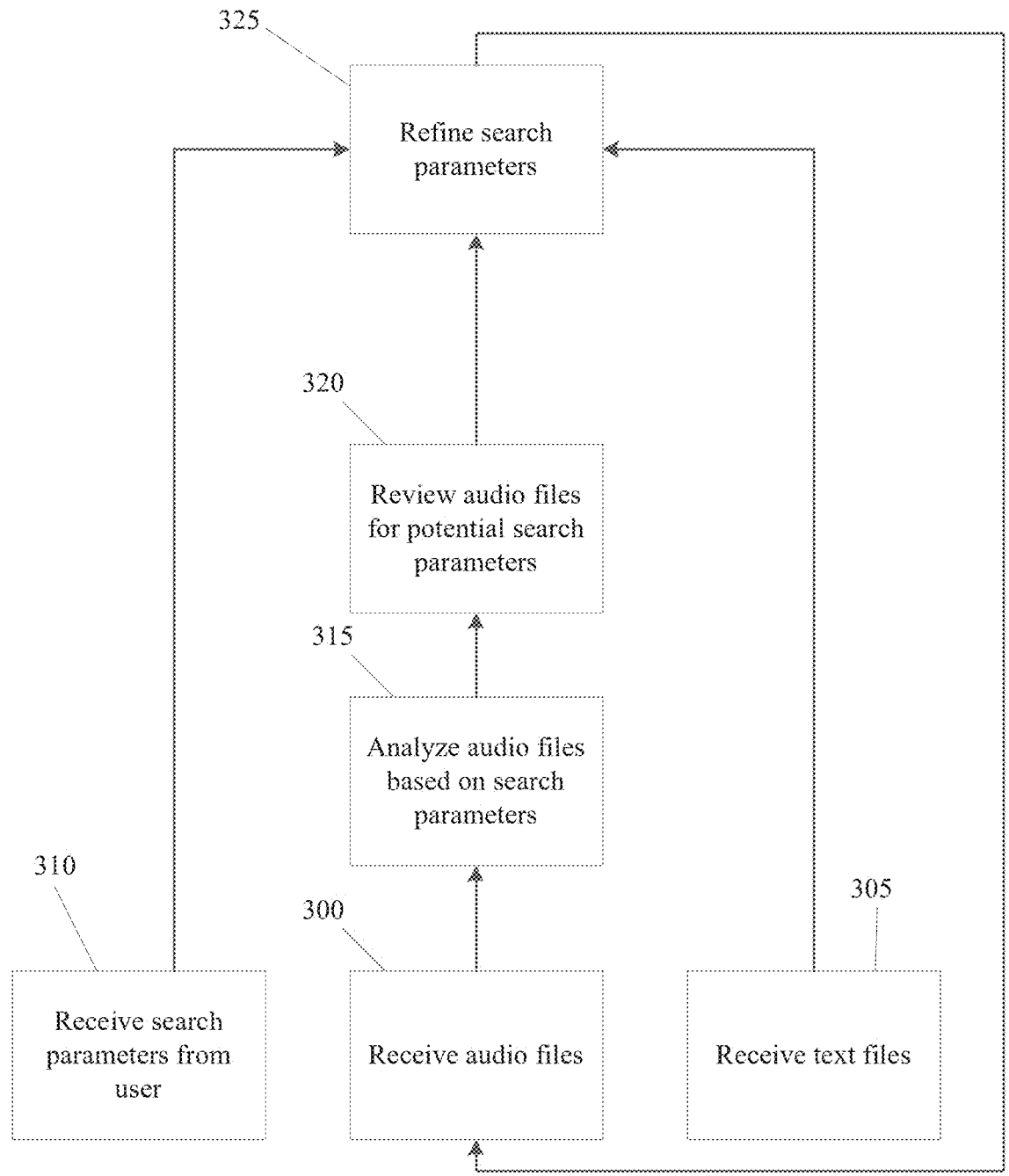
FIG. 3 is a flow chart illustrating an embodiment of a method for analyzing audio and text files to refine search terms.

Referring to FIG. 3, a flow chart of an embodiment of a method of analyzing audio and text files to refine search terms is illustrated. Other implementations may perform the steps in a different order, omit certain steps, and/or perform different and/or additional steps than those illustrated in FIG. 3. For convenience, aspects of FIG. 3 will be described with reference to a system of one or more components that perform the process. The system, for example, may include one or more components of the systems illustrated in FIG. 1 and FIG. 2.

At step 300, one or more audio files are received by the system. The audio files may be in the form of a digital representation of audio, such as, for example, a ".wav" file or MP3 file. In some implementations, the audio file may be further processed in order to assist the system in further analysis. For example, an audio file may be received and smaller audio segments may be generated based on the received audio file. An audio segment may be a continuous period of a larger audio file (e.g., a continuous 15 second interval) or may comprise multiple periods of a larger audio file (e.g., the first 15 seconds and the last 15 seconds). In some implementations, audio files may be provided to the system in the form of a text file and/or associated with a text file, where the text file contains a transcript of all or portions of an audio file. In some implementations, step 300 may be performed utilizing a module that shares one or more aspects with phonetic search engine 230.

At step 305, text files are received for determination of potential search phrases which may be present in the received text files. The received text files may include contents of emails, contents of documents, user created documents, customer created documents, and/or content from websites. In some implementations text files received at step 305 may be analyzed utilizing a module which shares one or more aspects with text mining engine 210. In some implementations, text files received at step may be transmitted from database 250 and/or external text sources 255. In some implementations, the system may access search phrases which were previously derived from one or more text files. For example, the search phrases may be stored in database 250 having a plurality of search phrases that have been determined to be important search phrases for a particular audio file received at step 300. In some implementations the identified search phrases may be particular to the type of audio file received at step 300. For example, one or more phrases may be identified with audio files received at step 300 pertaining to cell phone service provider service representatives and a second set of phrases may be identified from another index when audio files pertain to an insurance carrier service representative. In some implementations, the system may not perform step 305.

At step 310, the system receives search terms from a user. The user may manually input search phrases, terms, and/or categories of phrases based on one or more phrases which the user has interest in finding in one or more audio files. The user may input search terms utilizing one or more graphical user interfaces which may share one or more characteristics with the graphical user interface illustrated in FIG. 11. In some implementations the user may input search terms using an audio input such as a microphone and/or using another user interface. In some implementations, step 310 may not be performed.

At step 315, the audio files received at step 300 are analyzed based on search parameters received at step 310 and/or derived from text files received at step 305. In some implementations, step 315 may be performed by a module which shares one or more characteristics with phonetic search engine 230 and/or by audio search module 200. In some implementations, audio is analyzed via text transcriptions of audio previously generated by one or more modules. At step 315, one or more audio files are searched for the presence of the search terms or phrases which have been indicated. In some implementations, results of step 315 may be utilized to trigger one or more notifications based on the presence or absence of the search parameters.

At step 320, the audio files may be further analyzed to determine whether new search terms may be generated from the content of the audio files. In some implementations, step 320 may include suggesting refinements to one or more search phrases which were received at step 310. In some implementations, new search terms or phrases may be generated based on the contents of the audio files. For example, multiple instances of an additional phrase that was not initially searched for may indicate that the new phrase may be significant. Based on the co-occurrence of a potential new search term and one or more terms which were received at step 310, a new association may be constructed based on the co-occurrence of the new phrase and a previous search term. For example, while searching an audio file for the phrase "upset with my service," the phrase "cancel my service" may be identified multiple times in the searched audio file. A new association between the new phrase and the previous search phrase may be identified for future searches.

At step 325, the search phrases of step 310 are refined based on information provided in step 305, step 310, and/or step 320. Audio search module 200 may associate new search phrases with existing search phrases, alter existing search phrases, and/or eliminate one or more search phrases based on information provided at step 305, 310, and/or 320. For example, the system may receive the search phrase "cancel my account" from a user at step 310. After analysis at step 315 and review of the analysis at step 320, the system may find instances where both "I'd like to" and "Do not" appear in close proximity to "cancel my account." Because the co-occurrence of each of those terms with "cancel my account" may identify audio files which are likely to result in different outcomes, the system may suggest new phrases, such as "I'd like to cancel my account" and "Do not cancel my account." The system may additionally or alternative suggest eliminating the phrase "cancel my account" from prospective search phrases. Additionally, for example, the system may not find occurrences of the phrase "I'd like to cancel my account" but may find multiple instances of the phrase "I would like to cancel my account." The system may associate the two phrases together into a single term so that, when "I'd like to cancel my account" is chosen as a search phrase, the system may associate the phrase "I would like to cancel my account" as an additional acceptable match to the search phrase. The refined search phrases may then be utilized by the system to search further received audio files.

In some implementations, the steps of the method illustrated in FIG. 3 may be performed utilizing a system which shares one or more characteristics with the system illustrated in FIG. 2. In some implementations, analysis of audio files for potential matches to a key phrase may be executed utilizing a module which may share one or more characteristics with phonetic search engine 230 and/or emotion recognition engine 235. In some implementations, decisions on potential search phrases from text files may be suggested utilizing a module which shares one or more characteristics with text mining engine 240. In some implementations, decisions on including new search phrases, altering previous search phrases, and/or eliminating previous search phrases may be processed utilizing a module which shares one or more characteristics with data mining engine 240. In some implementations, a user may additionally or alternatively enter search phrases of interest utilizing a remote computing processor which may share one or more characteristics with workstation 270.

Figure 4:
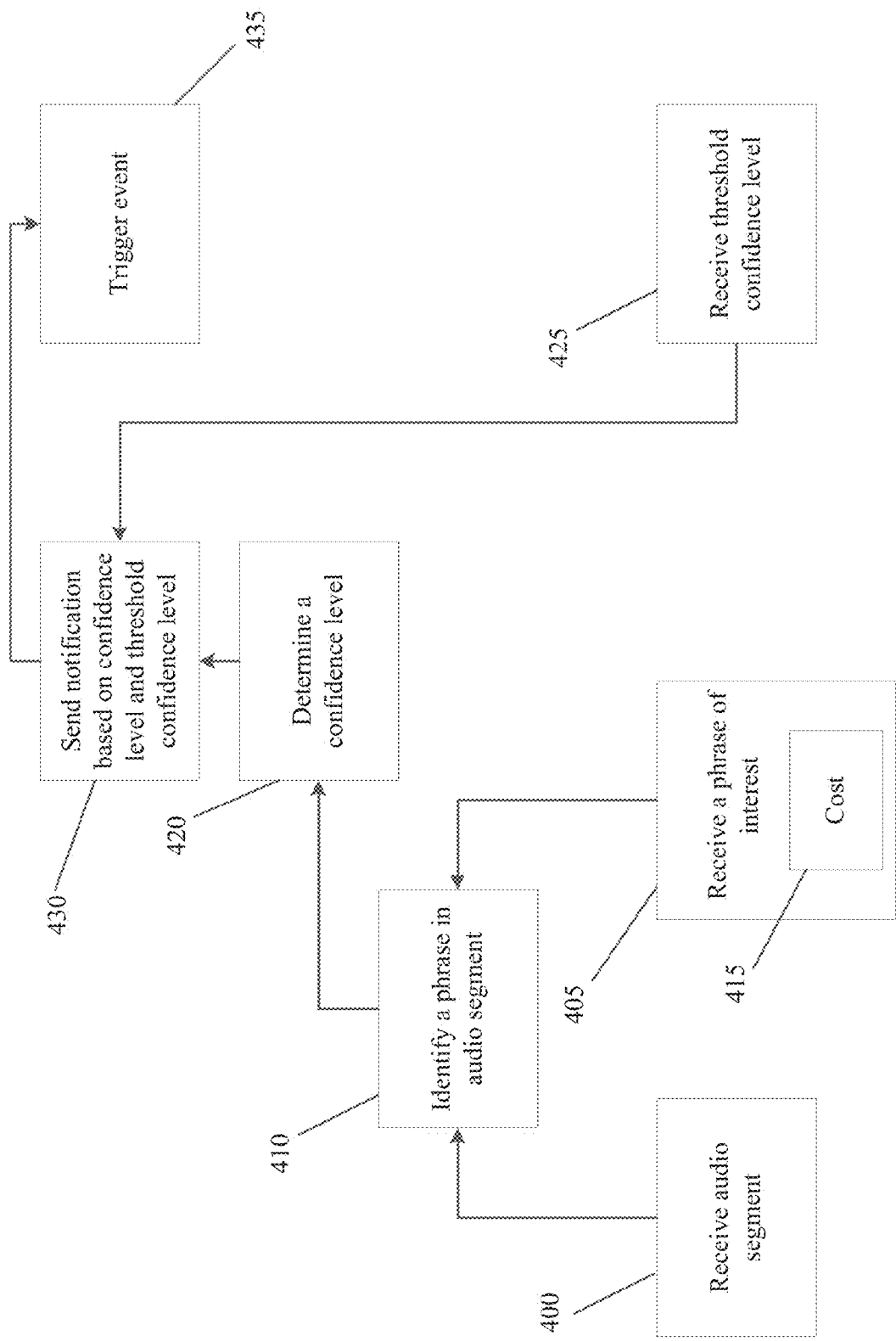
FIG. 4 is a flow chart illustrating an embodiment of a method for searching an audio file for one or more key phrases of interest.

Referring to FIG. 4, a flowchart of an embodiment of a method for searching an audio file for one or more key phrases of interest is illustrated. Other implementations may perform the steps in a different order, omit certain steps, and/or perform different and/or additional steps than those illustrated in FIG. 4. For convenience, aspects of FIG. 4 will be described with reference to a system of one or more components that perform the process. The system, for example, may include one or more components of the systems illustrated in FIG. 1 and FIG. 2.

At step 400, an audio segment is received by the system. The audio segment may be an audio file generated based on a phone conversation between a customer and a customer service representative. In some implementations, the audio segment received at step 400 may be a complete conversation. The audio file segment received at step 400 may be a fragment of a larger audio file. In some implementations, step 400 may be executed utilizing a module which shares one or more characteristics with audio search module 200. In some implementations step 400 may share one or more aspects with step 300 of FIG. 3.

At step 405, the system receives a phrase of interest. The phrase may include one or more words which a user has interest in locating and one or more audio segments. In some implementations, step 405 may include receiving multiple phrases. The user may have an interest in the co-occurrence of multiple phrases, the occurrence of one phrase and non-occurrence of a second phrase, and/or the non-occurrence of multiple phrases. A phrase of interest received at step 405 may be associated with a cost 415. In some implementations, the cost 415 associated with the phrase of interest may share one or more characteristics with the cost as previously described herein. In some implementations steps 300, 305, and 310 of FIG. 3 may share one or more common aspects with step 405.

At step 410, the audio segment received at step 400 is analyzed and a phrase in the audio segment is identified as a potential match to the phrase of interest from step 405. An audio file search may include direct analysis of an audio stream and/or analysis of metadata associated with an audio file, such as a text transcription. In some implementations, an audio file may be searched utilizing a phonetic analysis engine which may share one or more characteristics with phonetic search engine 230. In some implementations, phrases may be compared textually based on one or more criteria, such as the number of words shared by the phrases, the number of words between shared words of the phrases, the distance between shared words, a threshold of matching words, and/or an exact match between phrases. For example, the phrase "Cancel my subscription now" may be identified as a match to the search phrase "cancel monthly subscription" based on the criteria that the phrase shares at least two words with the search phrase, common words between the phrases are less than two words apart in the phrase, and/or the phrase contains more than 50% of the words in the search phrase. Also, for example, the phrase may not be a potential match if the search criterion requires exact matching between a phrase and the search phrase.

At step 420, a confidence level is determined based on the phrase of interest and the phrase identified at step 410. The confidence level determined at step 420 may reflect the likelihood that the phrase identified in step 410 matches the phrase of interest received at step 405. In some implementations, the confidence level may be represented as a percentage, as a decimal value, and/or as a real number. In some implementations, the confidence level determined at step 420 may additionally utilize cost 415. For example, the confidence level of a potential match to a phrase which may result in a monetary loss to a company, such as "I'm cancelling my account," may be adjusted to a level more likely to satisfy a threshold when a company may incur a significant cost if a caller cancels services. In some implementations, step 420 may be executed utilizing one or more modules which may share characteristics with audio search module 200 of FIG. 2.

At step 425, the system receives a threshold confidence level. A threshold confidence level may be assigned to one or more phrases based on data which may share characteristics with user input via workstation 270, external text sources 255, database 250, audio database 225, and/or one or more computing modules. Also, for example, the system may determine a threshold confidence level based on one or more factors, such as cost associated with a phrase, customer account information, and/or associated emotion recognition data. For example, the system may additionally receive emotion recognition data that identifies the speaker is angry. The system may determine a threshold confidence level that is more likely to be satisfied for phrases related to "Account Cancellation Reasons" to reduce the likelihood that an instance of a phrase related to account cancellations was missed during the investigation of the phrase. Also, for example, the system may determine a threshold confidence level that is more likely to be satisfied when the cost associated with a phrase is significant, such as when the cost represents a monetary loss to a company.

At step 430, the system may send a notification based on the threshold confidence level received at step 425 and the confidence level determined at step 420. In some implementations, a notification at step 430 will be sent when the confidence level determined at step 420 satisfies the threshold confidence level received at step 425. In some implementations, the notification sent at step 430 may trigger one or more subsequent events 435. For example, the notification of step 430 may trigger the marking of the audio file segment received at step 400 for further review when a match to the phrase of interest in step 405 was identified with a confidence level at step 420 that satisfies the threshold confidence level received at step 425. Also, for example, a notification may trigger an e-mail, text, and/or other message to a supervisor. The notification at step 430 may include information regarding whether an identified phrase in the audio segment exceeds the given minimum confidence level, the location within the audio file of the identified phrase, and/or information regarding the cost 415 associated with the phrase of interest. In some implementations, the notification of step 430 may trigger the alteration of one or more search phrases, utilizing a method which may share one or more characteristics with step 325.

Figure 5:
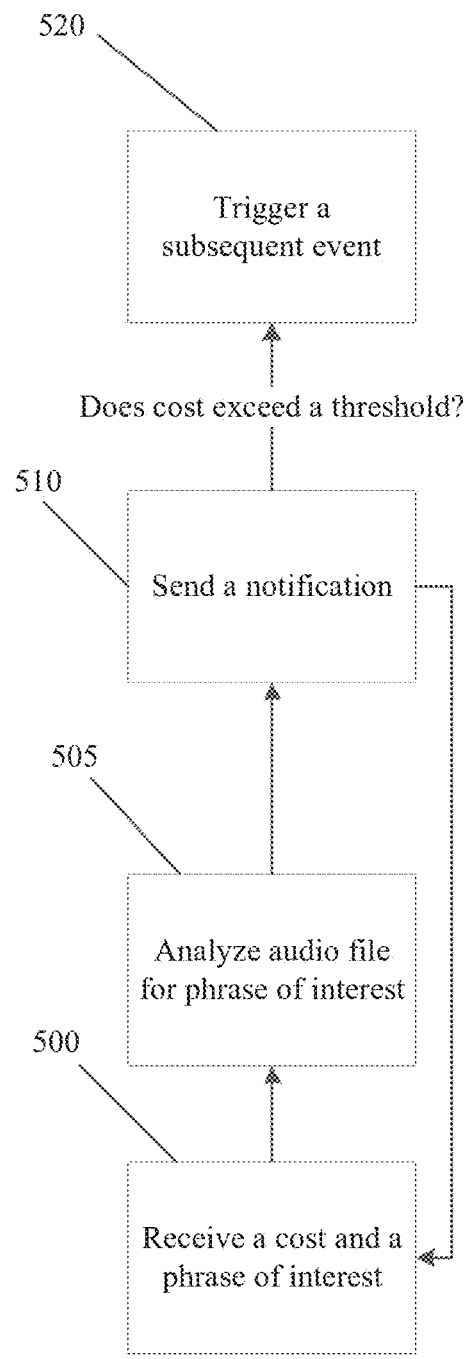
FIG. 5 is a flowchart illustrating an embodiment of a method for searching an audio file for one or more key phrases of interest and triggering a subsequent event.

Referring to FIG. 5, a flowchart of an embodiment of a method for searching an audio file for one or more key phrases of interest and triggering a subsequent event is illustrated. Other implementations may perform the steps in a different order, omit certain steps, and/or perform different and/or additional steps than those illustrated in FIG. 5. For convenience, aspects of FIG. 5 will be described with reference to a system of one or more components that perform the process. The system, for example, may include one or more components of the systems illustrated in FIG. 1 and FIG. 2.

At step 500, a phrase of interest is received by the system along with the cost associated with the phrase of interest. At step 505, an audio file is analyzed for the presence of the phrase of interest. In some implementations, the procedure for identifying a potential match to the phrase of interest may share one or more characteristics with steps 315 and/or 410. At step 510, the system generates a notification. The notification of step 510 may be utilized to trigger one or more subsequent events. In some implementations, notification 510 may trigger a subsequent event 520 when the cost associated with the phrase of interest exceeds a given threshold value. For example, the cost associated with phrase of interest may be a monetary amount. If the monetary amount exceeds a threshold amount, the system may alert the user of the potential loss of revenue and may optionally identify the particular estimated amount of loss of revenue. The cost threshold utilized by the system to determine whether a notification triggers a subsequent event may affect the confidence level to which a potential match to a phrase of interest is measured. For example, if the cost associated with a phrase of interest is significant, a potential match in an audio file to the phrase of interest may require a lower threshold to ensure that a potential significant monetary loss is not incurred without an event being triggered. Based on the associated costs, a user may have a higher tolerance for false-positive identifications then for false-negative identifications. In some implementations, the event triggered at step 520 may include adjusting the cost associated with the phrase of interest based on analysis results from step 505 and executing the method on one or more additional audio files.

Figure 6:
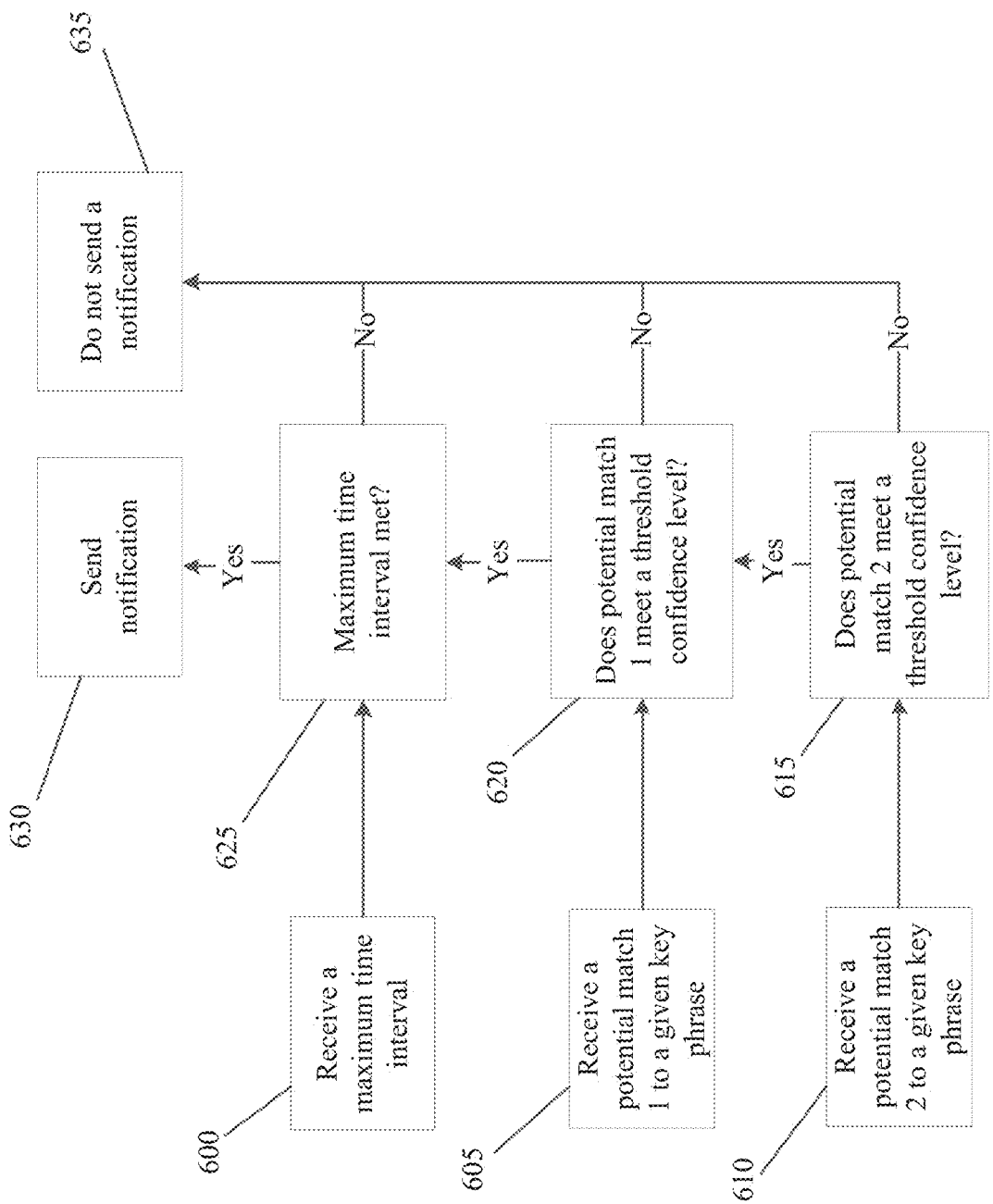
FIG. 6 is a flow chart illustrating an embodiment of a method to search an audio file for the co-occurrence of two phrases.

Referring to FIG. 6, an embodiment of a method to search audio files for the co-occurrence of two phrases is illustrated. Other implementations may perform the steps in a different order, omit certain steps, and/or perform different and/or additional steps than those illustrated in FIG. 6. For convenience, aspects of FIG. 6 will be described with reference to a system of one or more components that perform the process. The system, for example, may include one or more components of the systems illustrated in FIGS. 1 and 2.

At step 600, the system receives a maximum time interval. The maximum time interval may represent the maximum allowable time between two potential matches for two given key phrases. At step 605, the system receives a potential match location to a first key phrase in an audio file. At step 610, the system receives a location of a potential match to a second key phrase in the audio file. Step 605 and step 610 may optionally share one or more aspects with one or more with steps 320, 410, 420, and/or 505. Additionally or alternatively, the first key phrase and/or the second key phrase may be associated with one or more costs and/or threshold confidence levels for the probability that a potential match to a phrase in an audio file is the phrase of interest. At step 615, the system compares an identified confidence level that the potential match to the second key phrase meets the given threshold confidence. At step 620, the system compares an identified confidence level of the potential match of the first given key phrase to the location in the audio file. If the identified confidence level for the potential match for the first given key phrase does not meet a given threshold confidence level and/or if the identified confidence level for the potential match for the first given key phrase does not meet a given threshold confidence level, the system proceeds to step 635 and does not send a notification. If both the first potential match and the second potential match meet a threshold confidence level, the system may further compare the locations of the first potential match and the second potential match to each other at step 625. If the location between the first potential match and the second potential match does not exceed the maximum time interval received at step 600, the system may send a notification 630. For example, the maximum time interval value received at step 600 may be 30 seconds. The maximum time interval of 30 seconds is the maximum time on the audio file between which the phrases received at step 605 and 610 may be located in order for the system to issues a notification. If the first potential match to the first phrase and the second potential match to the second phrase are 15 seconds apart on the audio file, the system will issue a notification. If the phrases are 100 seconds apart, the system will not issue a notification. In some implementations, the notification of step 630 may trigger one or more subsequent events. In some implementations, the absence of the notification as illustrated in step 635 may trigger one or more subsequent events. For example, the notification of step 630 may trigger the flagging of the audio file, an email may be sent to a supervisor, and/or an interface may display one or more aspects of the audio file. Additionally or alternatively, the occurrence of two given key phrases outside of the maximum time interval of step 600 may trigger a notification. For example, a company may be interested in customer service calls which last longer than five minutes. The phrases "Hello" and "Have a nice day" may be phrases of interest as audio markers of the start and end of a phone call. A maximum time interval of five minutes may send a notification when an audio file contains the two phrases and they occur more than five minutes apart.

Figure 7:
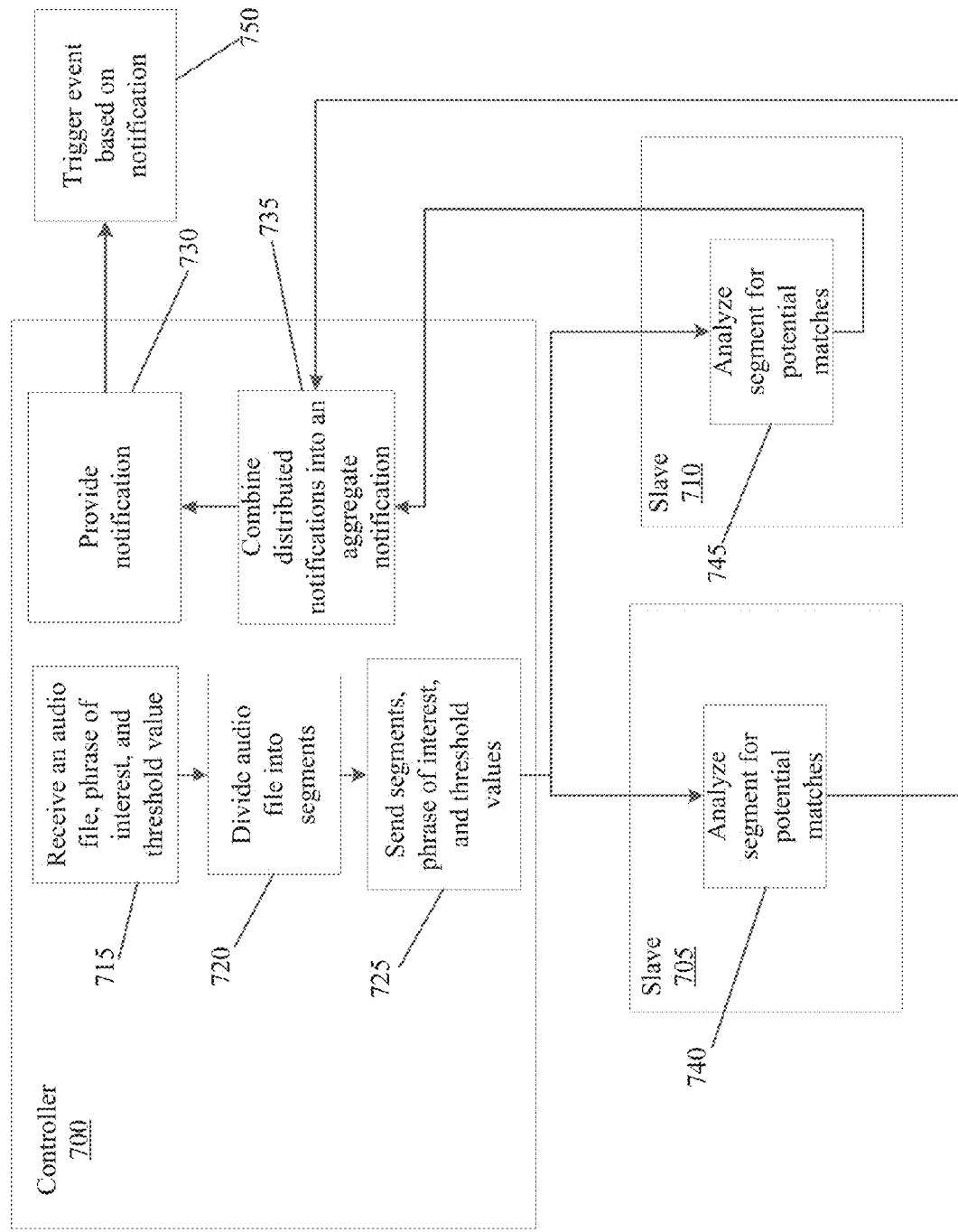
FIG. 7 is a flow chart illustrating an embodiment of a method for using distributed computing processors to locate one or more key phrases in an audio file.

Referring to FIG. 7, a flowchart of an embodiment of a method for using distributed computing processors to locate one or more key phrases in an audio file is illustrated. Other implementations may perform the steps in a different order, omit certain steps, and/or perform different and/or additional steps than those illustrated in FIG. 7. For convenience, aspects of FIG. 7 will be described with reference to a system of one controller 700 and two slave devices 705 and 710 that perform the process. In some implementations, one or more additional controllers and/or slave devices may be utilized to perform the steps of the illustrated method. The system, for example, may include one or more components of the systems illustrated in FIGS. 1, 2, and 16.

At step 715, controller 700 receives an audio file, a phrase of interest, and a threshold value of the likelihood that a location in the audio file matches the phrase of interest. In some implementations, the procedure for receiving an audio file, phrase of interest, and/or threshold value may share one or more characteristics with step 300 and/or step 400. In some implementations, step 715 may additionally include receiving a cost associated with the phrase of interest as illustrated in FIG. 4 and described herein. The cost may be used, for example, to determine whether there is a match between a given phrase and a potential match in an audio file to affect the threshold confidence level associated with the phrase, and/or trigger an event based on cost.

At step 720, the audio file received at step 715 is divided into smaller audio file segments. In some implementations, the controller may receive multiple audio files at step 715 and the audio file segments generated at step 720 may be comprised of the entirety of one or more audio files. At step 725, audio file segments generated in step 720 are transmitted to slave 705 and slave 710 for further analysis. In some implementations, slaves 705 and 710 may receive one or more complete audio files from controller 700.

At steps 740 and 745, slave 705 and slave 710 analyze the segments received from controller 700. In some implementations, step 740 and 745 may include one or more methods which share one or more characteristics with the methods described in FIGS. 3 through 6 and described herein. For example, slave 705 and/or slave 710 may search one or more given audio files for the occurrence and/or non-occurrence of one or more phrases, identify the occurrence or non-occurrence of phrases based on a maximum or minimum time interval, and/or determine the probability of a match to a position in an audio file based on a given cost and/or threshold confidence level. After slave 705 and slave 710 analyze the respective audio segments, analysis results may be transmitted to controller 700 for further analysis. In some implementations, the analysis results from slave 705 and slave 710 may share one or more characteristics with a notification as described herein.

At step 735, controller 700 combines the resulting notifications from slave 705 and slave 710 into an aggregate notification. The aggregate notification generated in step 735 may combine one or more aspects of the notifications generated by slave 705 and slave 710. In some implementations, notifications from slave 705 and/or slave 710 may be utilized to trigger one or more additional events. At step 730, controller 700 provides the aggregate notification to one or more subsequent systems. For example, the aggregate notification provided in step 730 may be utilized to further adjust a cost associated with the phrase of interest received at step 715, refine one or more phrases of interest received at step 715, and/or notify one or more systems that controller 700 is free to process additional audio files.

Referring to FIG. 8, an example graphical user interface for selecting search terms that may be implemented in an embodiment of an audio file search engine is illustrated. In some implementations, one or more elements of the graphical user interface of FIG. 8 may be absent. In some implementations, the graphical user interface may contain one or more additional elements. For example, the graphical user interface of FIG. 8 may additionally include information regarding associated costs and/or confidence level thresholds associated with one or more key phrases. The graphical user interface of FIG. 8 may be implemented utilizing one or more applications executing on workstation 270.

Key phrases 800 may be text representations of one or more phrases of interest to be utilized to search one or more audio files. In the illustrated example, key phrases 800 may be generated by a user and/or generated utilizing one or modules as described herein. For example, one or more key phrases 800 may be generated utilizing phonetic search engine 230, text mining engine 245, and/or one or more additional modules executing in audio search module 200. In some implementations, one or more key phrases 800 may be generated utilizing procedures which may share one or more steps with the methods illustrated in the flowcharts of FIGS. 3 through 6 and described herein.

For each key phrase 800, a user may have one or more actions available to further investigate and/or alter a key phrase 800. Edit button 805 may allow a user to alter and/or update a key phrase 800. For example, edit button 805 may direct a user to an editing page where the user may edit one or more characteristics of the identified key phrase 800, such as cost associated the key phrase, an associated confidence level to be used as a minimum threshold value when an audio file is searched for the key phrase, and/or adding or eliminating one or more words from the phrase. View button 710 may direct the user to a page where the user may view one or more aspects of a key phrase 800. The user may view an associated cost, an associated threshold confidence level, and/or one or more additional aspects of an identified key phrase. Delete button 815 may be utilized to eliminate one or more key phrases 800 from future searches. For example, "cancel my account" key phrase may no longer be a valid search term. A user may activate the delete button 815 associated with the key phrase 800, which may eliminate the key phrase from future searches.

Figure 9:
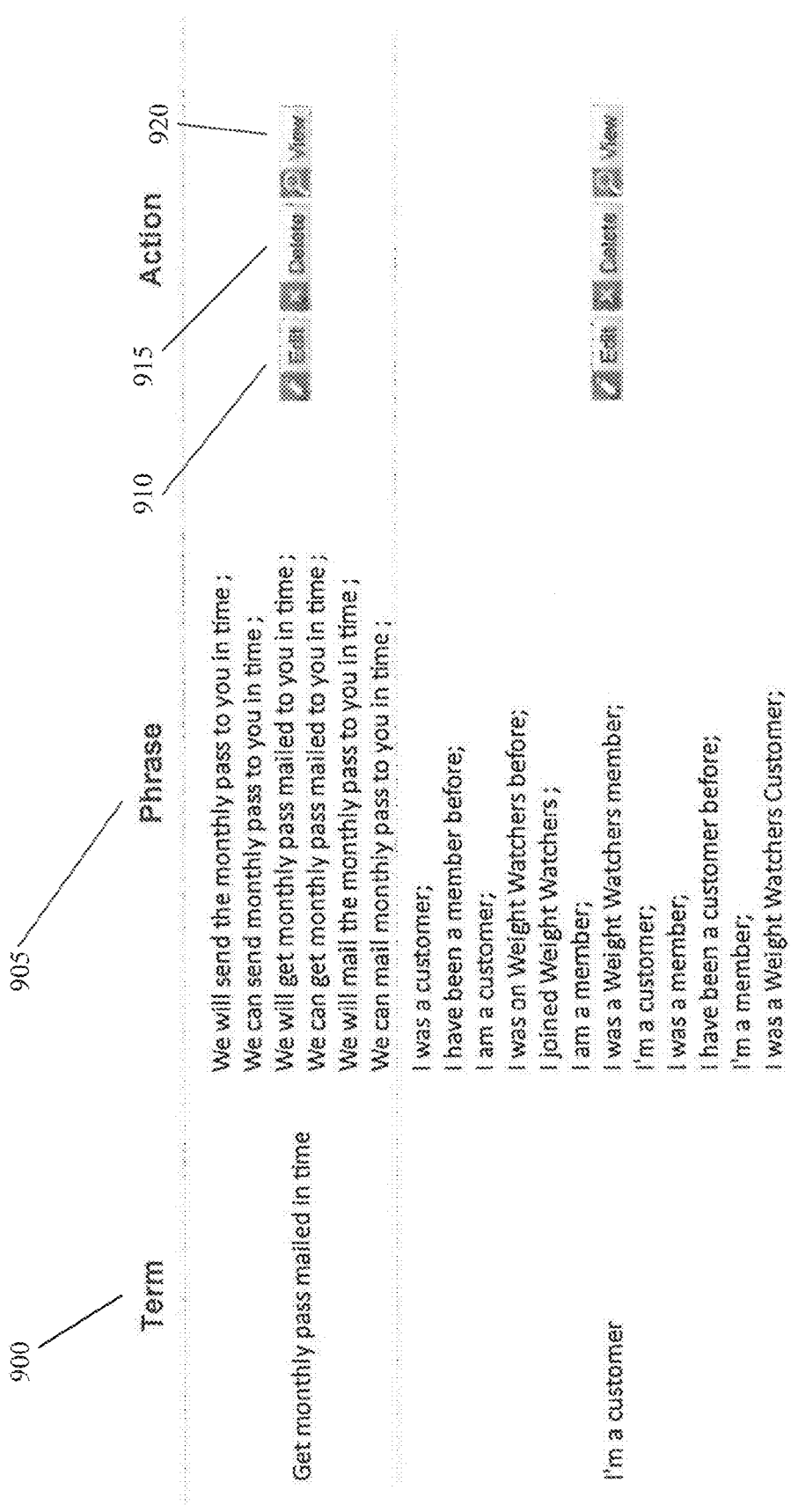
FIG. 9 illustrates an example graphical user interface for displaying a search phrase hierarchy that may be implemented in an embodiment of an audio file search engine.

Referring to FIG. 9, an example graphical user interface for displaying a search phrase hierarchy that may be implemented in an embodiment of an audio file search engine is illustrated. In some implementations, one or more elements of the graphical user interface of FIG. 9 may be absent. In some implementations, the graphical user interface may contain one or more additional elements. The graphical user interface of FIG. 9 may be implemented utilizing one or more applications executing on workstation 270.

Term column 900 displays general definitions of one or more phrases displayed in phrase column 905. For each term in term column 900, one or more phrases may be associated with the term. Phrases in phrase column 905 may be variations of speech which are generally covered by the associated term in term column 900. For example, the first term in term column 900 is "get monthly pass mailed in time." Six phrases have been associated with that term and each of the six phrases are potential variations that may be recognized in an audio file and which have the same essential meaning as the associated term in term column 900. The term "we will send the monthly pass to you in time" may reflect the same meaning as the term "get monthly pass mailed in time." Likewise, the phrase "we can send monthly pass to you in time" may share a similar meaning with the first phrase and may be identified as having the same meaning as the associated term in term column 900. In some implementations identification of similar meanings between two or more phrases may be based on determined confidence levels between the two or more phrases. For example, confidence levels may be determined utilizing step 425 and the phrases may be grouped into the same term based on such determination. For each term in term column 900, one or more actions may be executed to vary and/or alter a term name, a phrase associated with the term name, and/or one or more threshold values associated with a term and/or a phrase (e.g., threshold confidence level, cost). Edit button 910 may allow a user to edit one or more phrases, add one or more phrases, delete one or more phrases, edit one or more values associated with a phrase, edit a term name, alter a term name, and/or edit one or more values associated with a term. Delete button 915 may be utilized to delete a term from term column 900. View button 920 may be utilized to examine one or more additional values associated with a term in the corresponding term column 900. Phrases in phrase column 905 may share one or more characteristics with phrases in phrase column 800 as illustrated in FIG. 8 and described herein. In some implementations, view button 920 and/or edit button 910 may direct the user to a page which shares one or more characteristics with the display illustrated in FIG. 8.

Figure 10:
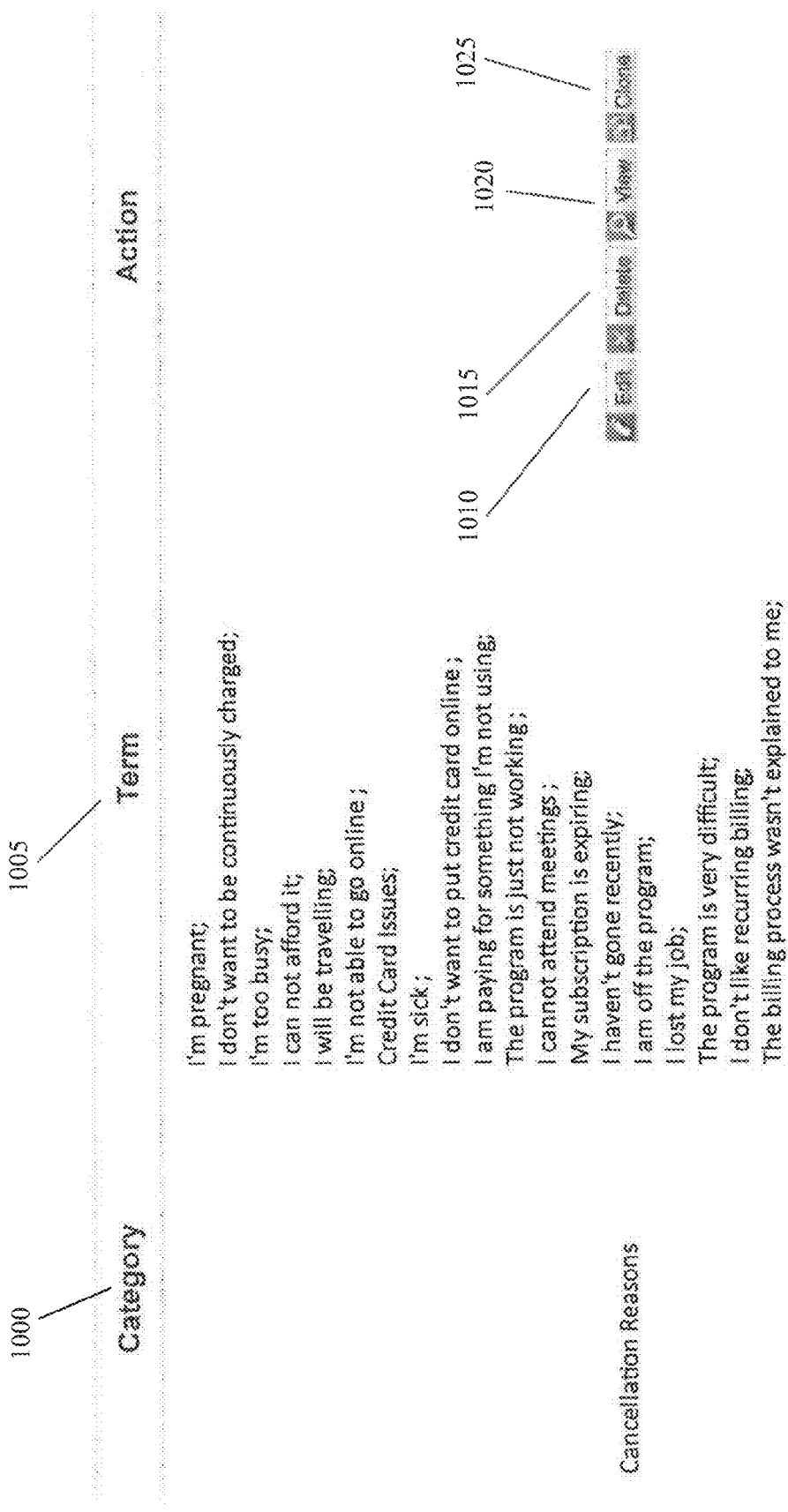
FIG. 10 illustrates an example graphical user interface for displaying a search term hierarchy that may be implemented in an embodiment of an audio file search engine.

Referring to FIG. 10, an example graphical user interface for displaying a search term hierarchy that may be implemented in an embodiment of an audio file search engine is illustrated. Other implementations may have one or more components in different configurations, omit certain components, contain additional components, and/or one or more components may perform different and/or additional tasks than those illustrated in FIG. 10. For convenience, aspects of FIG. 10 will be described with reference to a system of one graphical interface. In some implementations, the graphical interface displaying the graphical user interface of FIG. 10 may share one or more aspects with workstation 270 as illustrated in FIG. 2 and described herein. The graphical user interface FIG. 10 may be generated by system which may share one or more characteristics and/or may include one or more components of the systems illustrated in FIGS. 1 and 2. Edit button 1010 may allow a user to edit one or more terms, add one or more terms, delete one or more terms, edit one or more values associated with a term, edit a term and/or category name, and/or edit one or more values associated with a category. Delete button 1015 may be utilized to delete a category from category column 1000. View button 1020 may be utilized to examine one or more additional values associated with a category in the corresponding category column 1000. Terms in term column 1005 may share one or more characteristics with terms in term column 900 as illustrated in FIG. 9 and described herein. In some implementations, view button 1020 and/or edit button 1010 may direct the user to a page which shares one or more characteristics with the display illustrated in FIG. 9. Entries in category column 1000 may represent one or more general categories to which terms may be grouped. Entries in term column 1005 may represent one or more terms which have been associated with a corresponding category listed in category column 1000. Terms in term column 1005 may share one or more aspects with terms listed in term column 900.

Figure 11:
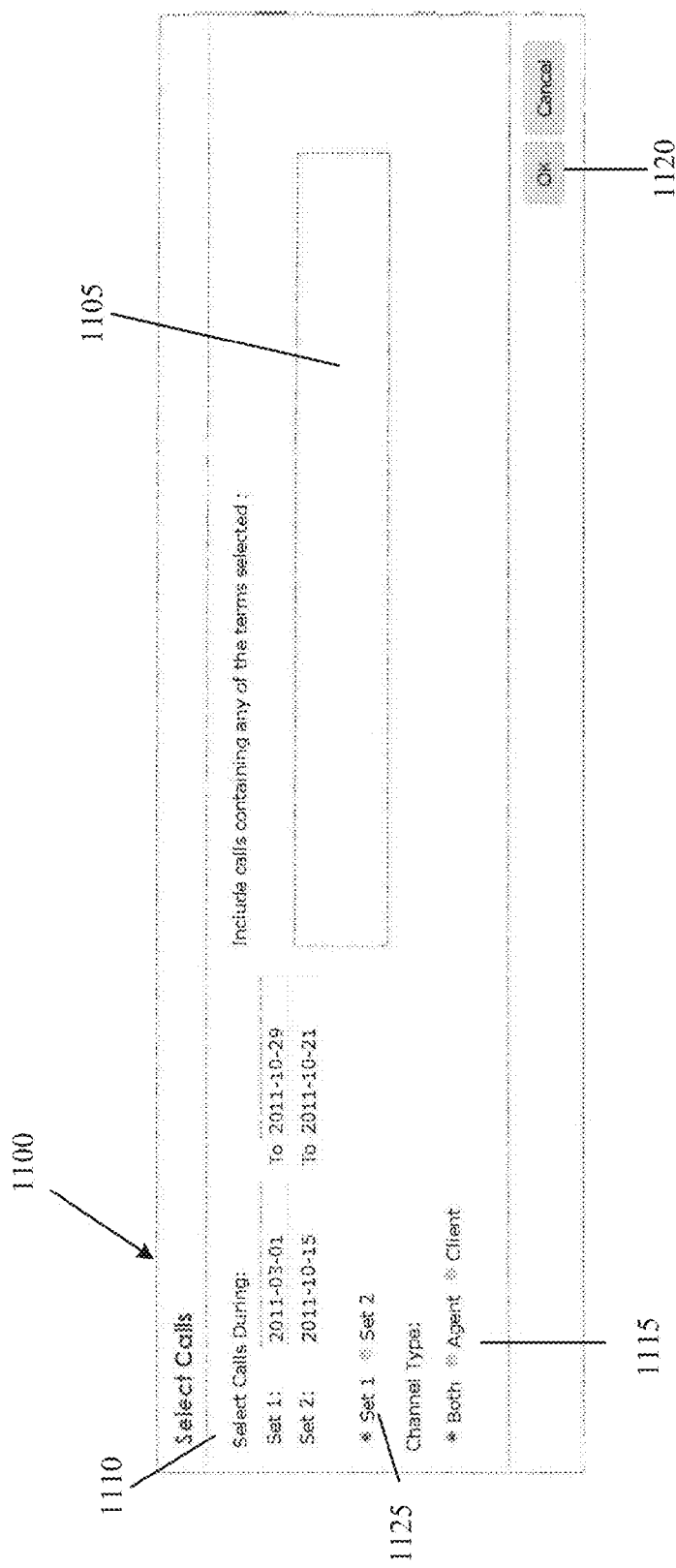
FIG. 11 illustrates an example graphical user interface for inputting search terms that may be implemented in an embodiment of an audio file search engine.

Referring to FIG. 11, an example graphical user interface for inputting search terms that may be implemented in an embodiment of an audio file search engine is illustrated. Other implementations may have one or more components in different configurations, omit certain components, contain additional components, and/or one or more components may perform different and/or additional tasks than those illustrated in FIG. 11. For convenience, aspects of FIG. 11 will be described with reference to a system of one graphical interface. In some implementations, the graphical interface displaying the graphical user interface of FIG. 11 may share one or more aspects with workstation 270 as illustrated in FIG. 2 and described herein. The graphical user interface FIG. 11 may be generated by a system which may share one or more characteristics and/or may include one or more components of the systems illustrated in FIGS. 1 and 2.

The search term interface 1100 may enable the user to specify terms and/or phrases to be used as search parameters in an audio file search engine. In some implementations, search term interface 1100 may be presented to a user in response to user activating an "edit" button illustrated in previous figures. For example, search term interface 1100 may be displayed when user selects edit button 1010 of FIG. 10, edit button of FIG. 9, and/or edit button 805 of FIG. 8. In some implementations, search term interface 1100 may be displayed as a pop-up display when one or more options are selected on one or more additional graphical user interface screens.

Text box 1105 may enable a user to enter one or more search phrases to be utilized in searching audio files. The user may enter a sentence, a sentence fragment, and/or one or more additional characters into text box 1105. For example, a user may have interest in audio files which contain the words "cancel my account." The user may enter the phrase "cancel my account" into the search field and activate button 1122 to submit the sentence fragment to the search engine. A user may additionally enter one or more phrases simultaneously into text box 1105 to be utilized to search audio files for each phrase individually, the co-occurrence of multiple phrases, the occurrence of one or more phrases with the non-occurrence of one or more phrases, and/or the nonoccurrence of multiple phrases. For example, a second phrase "too expensive" may be entered into text box 1105. Multiple phrases may be delineated based on one or more characters with particular significance. For example search terms may be delineated by a semicolon, a comma, quotation marks surrounding a search phrase, and/or one or more additional phrase separator characters.

Set selection buttons 1125 may be utilized to select one or more groups of audio files to be searched utilizing the audio file search engine. Selected set display 1110 may display one or more optional sets which may be selected using set selection buttons 1125. In some implementations, one or more audio file sets selected with set selection buttons 1125 may be used with phrase inputs in text box 1105 to perform a search when button 1120 is activated. In one or more implementations, activating a search using button 1120 may result in displaying one or more graphical user interfaces which may share one or more aspects with the results graphical user interfaces illustrated in FIGS. 12 through 15 and described herein.

Figure 12:
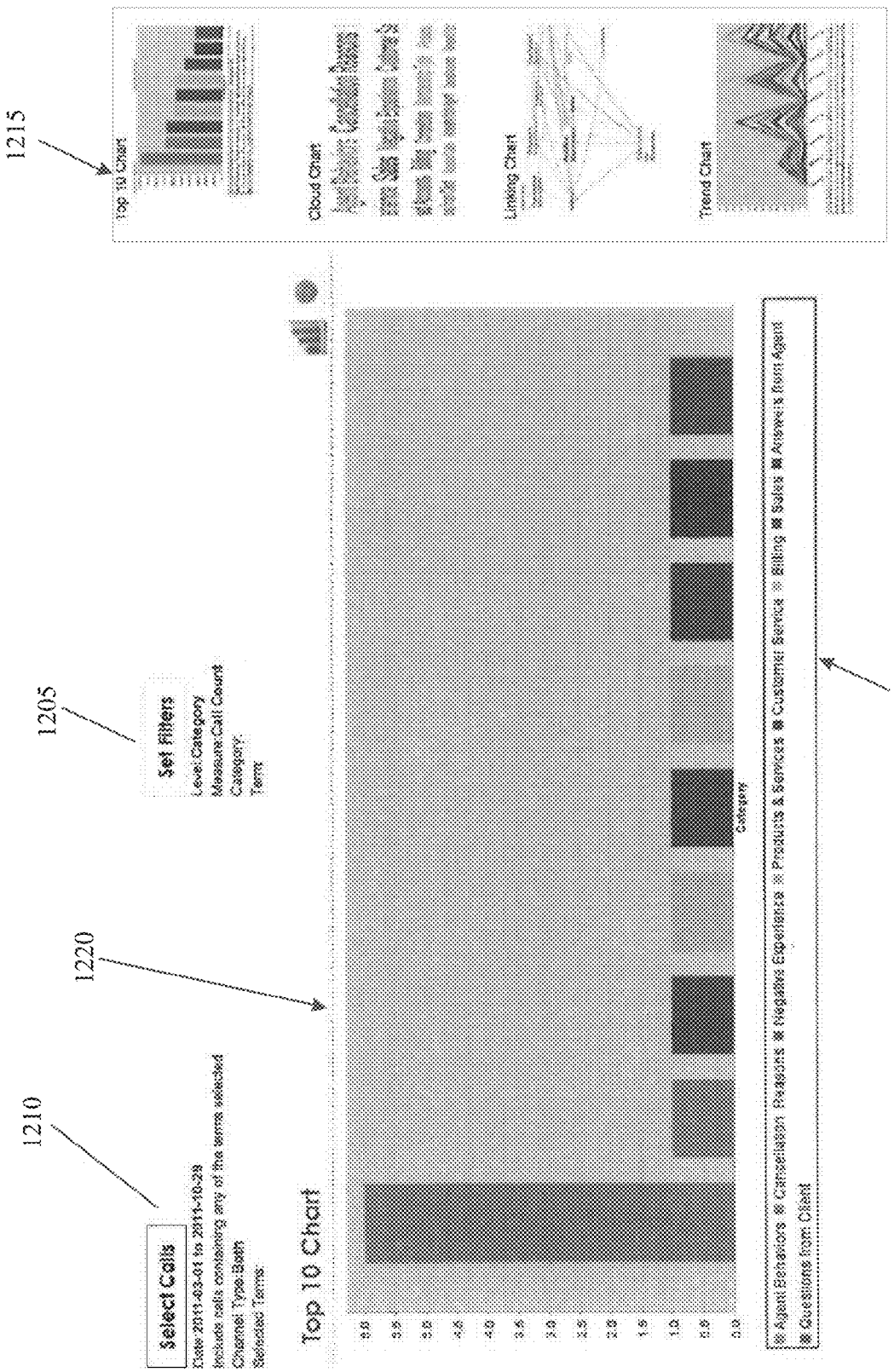
FIG. 12 illustrates an example graphical user interface for a bar graph to display information regarding the presence of phrases in audio files which may be implemented in an embodiment of an audio file search engine.

Referring to FIG. 12, an example graphical user interface for a bar graph to display information regarding the presence of phrases in audio files which may be implemented in an embodiment of an audio file search engine is illustrated. For convenience, aspects of FIG. 12 will be described with reference to a system of one graphical interface. In some implementations, the graphical interface displaying the graphical user interface of FIG. 12 may share one or more aspects with workstation 270 as illustrated in FIG. 2 and described herein.

The graphical user interface of FIG. 12 may be generated by a system which may share one or more characteristics and/or may include one or more components of the systems illustrated in FIGS. 1 and 2.

Bar graph 1220 is an illustration of an example result from a search of one or more audio files. On the illustrated bar graph, the height of bars represents a number of audio files which contain a category of interest. Each bar on bar graph 1220 may represent a category of phrases which were used as search parameters in a search of audio files. Legend 1225 associates each bar in bar graph 1220 with a specific category. For example, the first bar in bar graph 1220 is depicted with the same shade as the square next to the category "cancellation reasons" in legend 1225. In the illustrated implementation, the units for the y-axis of bar graph 1220 are the number of audio files which contain matches to the corresponding category. Barograph 1220 illustrates that six audio files contain phrases associated with the category "cancellation reasons." The remaining bars in bar graph 1220 have a height corresponding to one audio file for each category. In some implementations, the x- or y-axis may have different units and/or may display additional or alternative information. For example, each bar in bar graph 1220 may represent a set of terms and/or a set of phrases as previously described. The y-axis may measure the height of bars with alternative units, such as percentage of audio files containing phrases from a category, instances of matches to search phrases, and/or a count of audio files which did not contain matches to one or more phrases associated with the term or category.

In some implementations, bar graph 1220 may be utilized to represent confidence levels and/or costs associated with potential matches to key phrases in one or more audio files. For example, each bar in bar graph 1220 may represent a particular key phrase. The height of each bar may be related to a measurement of the confidence level that one or more audio files of interest contain the corresponding key phrase. As described herein, the confidence level may take into account one or more identified characteristics such as, for example, associated costs, customer account information, and/or emotion recognition data. In some implementations, one or more audio files may be investigated for a particular set of key phrases and each bar may represent an aggregate confidence level of the presence of particular key phrases in the set of audio files. Additionally or alternatively, each bar may represent a category of phrases and the height of each bar may represent the likelihood that one or more of those phrases is present in one or more investigated audio files. In some implementations, each bar may represent a cost for a given set of categories or phrases. For example, a bar graph representing "Account Cancellation" may include aggregate sums of the costs of matches to the terms in the category, such as "Too expensive," "Do not like billing system," and/or "Do not like the service."

Call information area 1210 may display one or more pertinent characteristics of audio files used in a phrase search. In the illustrated implementation, call information area 1210 includes a set of dates which may represent a time interval from which all audio files contained in the search were initially recorded. Channel type may describe the particular voice stream from an audio file which was utilized during an audio search. For example, a phone call between two callers may contain 2 channels: one for each speaker in the call. The user may select one or more channels contained in an audio file be used in an audio search. In some implementations, call information area 1210 may contain information regarding categories, terms, and/or search phrases which were used as parameters in a search of audio files.

Filter area 1205 may list one or more filters which were utilized to filter one or more aspects of search results from being included in bar graph 1220. In the illustrated example, a filter is set to display a bar graph where each bar represents a category. In some implementations, a filter may be activated which categorizes and displays bars based on groups of search terms and/or specific phrases. For example, a filter may be activated which displays each bar as a term contained within a specified category.

Graph selection area 1215 may display thumbnail versions of one or more additional and/or alternative displays for search result information. In some implementations, individual images in graph selection area 1215 may be smaller versions of more search result interfaces illustrated in FIGS. 13 through 15 and described herein. In one or more implementations, additional or alternative display options may be displayed in graph selection area 1215, such as a pie graph. In some implementations, one or more images in graph selection area 1215 may be clickable and when activated, may direct the user to one or more additional and/or alternate display pages which may share one or more characteristics with the displays illustrated in FIGS. 13 through 15 and described herein.

Figure 13:
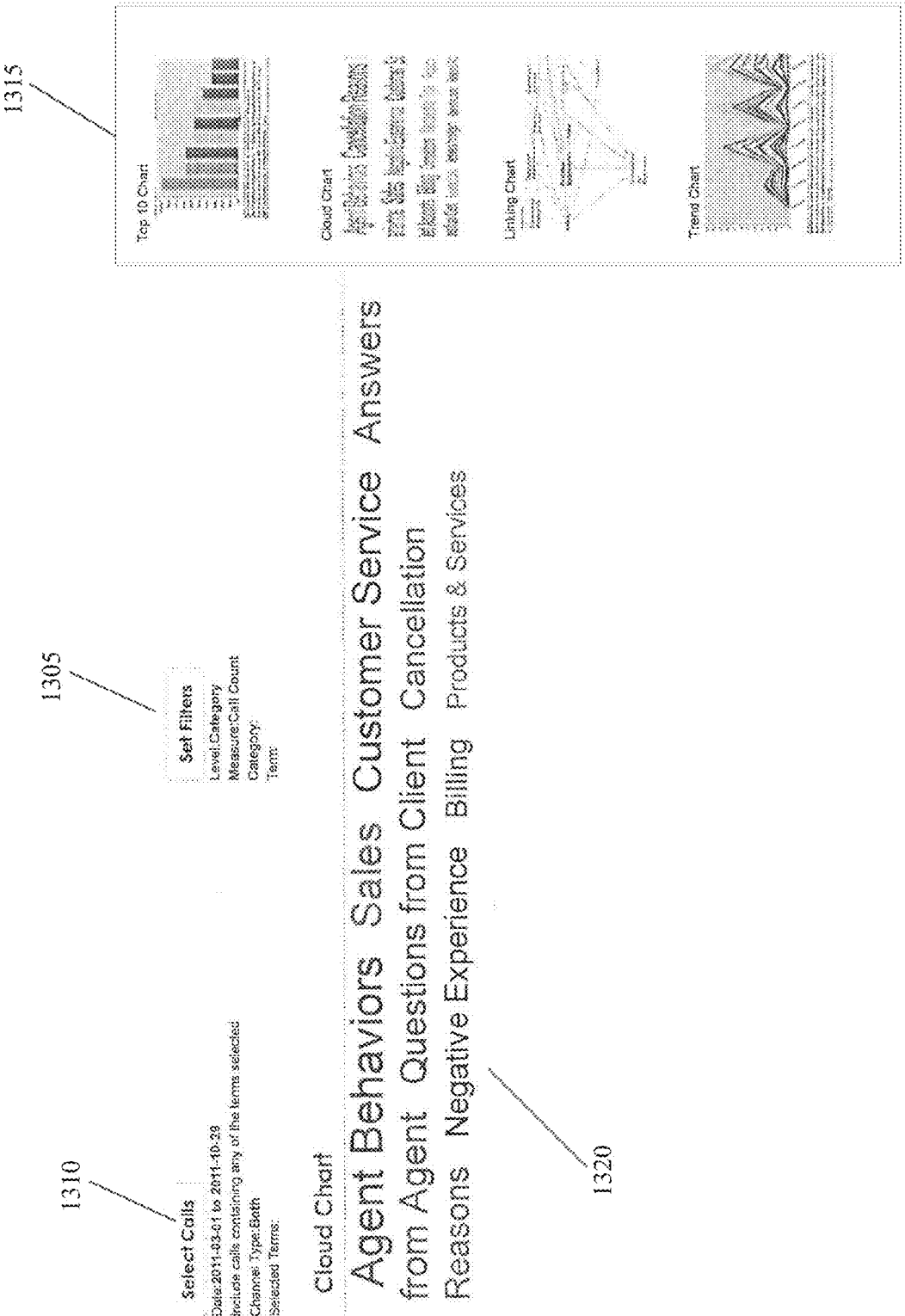
FIG. 13 illustrates an example graphical user interface for a word cloud to display information regarding the presence of phrases in audio files which may be implemented in an embodiment of an audio file search engine.

Referring to FIG. 13, an example graphical user interface for a word cloud to display information regarding the presence of phrases in audio files which may be implemented in an embodiment of an audio file search engine is illustrated. For convenience, aspects of FIG. 13 will be described with reference to a system of one graphical interface. In some implementations, the graphical interface displaying the graphical user interface of FIG. 13 may share one or more aspects with workstation 270 as illustrated in FIG. 2 and described herein. The graphical user interface of FIG. 13 may be generated by a system which may share one or more characteristics and/or may include one or more components of the systems illustrated in FIGS. 1 and 2.

Word cloud 1320 is an illustration of an example result from a search of one or more audio files. In the illustrated display, the font size may represent the number of audio files which contain one or more phrases associated with a category. In some implementations, the font size may represent the number of occurrences of phrases associated with a category, the frequency of occurrences of phrases associated with a category, a cost associated with phrases in one or more categories, and/or a confidence level of phrase matches in one or more audio files. Each set of words in word cloud 1320 may represent a category of phrases which were used as search parameters in a search of audio files. For example, the phrase "Agent Behaviors" is depicted in a larger font than the remaining phrases. The largest font size may be indicative of a search which resulted in locating phrases within the category "Agent Behaviors" more than phrases in the remaining categories. Phrases that may be included in the category "Agent Behaviors" include, for example, "Thank you for calling," "We have a new promotional offer," and/or "This call may be monitored." The remaining phrases in word cloud 1320 may have a font size in proportion with other phrases in the cloud based on the relative counts of audio files containing phrases associated with respective categories. In some implementations, the sets of words in word cloud 1320 may represent additional or alternative groupings of phrases. For example, the sets of words in word cloud 1320 may be a terms associated with a particular category, such as the terms listed in term column 1005 in FIG. 10 and/or in term column 9005 of FIG. 9. Additionally, the font size may represent alternative units, such as percentage of audio files containing phrases from a category, account of instances of matches to search phrases in one or more audio files, and/or a count of audio files which did not contain matches to one or more phrases associated with a term or category.

In some implementations, word cloud 1320 may be utilized to represent confidence levels of potential matches to key phrases in one or more audio files. For example, each word in word cloud 1320 may represent a particular key phrase. The font size of each word may be related to a measurement of the confidence level that an audio file of interest contains the written phrase. As described herein, the confidence level may take into account one or more identified characteristics such as, for example, associated costs, customer account information, and/or emotion recognition data. In some implementations, one or more audio files may be investigated for a particular set of key phrases and each set of words may represent an aggregate confidence level of the presence of particular key phrases in the set of audio files. Additionally or alternatively, each set of words may represent a category of phrases and the font size for each set of words may represent the likelihood that one or more of those phrases is present in one or more investigated audio files. In some implementations, a word cloud may represent costs for a given set of categories or phrases. For example, font size in a word cloud for the set of words "Account Cancellation" may represent a sum of the costs of matches to all terms and/or phrases in the corresponding category, such as "Too expensive," "Do not like billing system," and/or "Do not like the service." In some implementations, one or more audio files may be investigated for particular set of phrases and the font size of each set of words may represent a confidence level of the presence of the corresponding written phrase in the investigated audio files. Additionally or alternatively, each set of words in word cloud 1320 may represent a category of phrases and the font size of each phrase may represent the likelihood that one or more phrases associated with the respective category is present in one or more of the investigated audio files.

Call information area 1310 may display one or more characteristics of audio files used in a phrase search. In the illustrated interface, call information area 1310 includes a set of dates that may represent a time interval from which all audio files contained in a search were initially recorded. Channel type may describe a particular voice stream from an audio file which was utilized during a phrase search. For example, a phone call between two callers may contain two channels: one for each speaker in the call. The user may select one or more channels contained in an audio file to be used in a search with given key phrases. In some implementations, call information area 1310 may contain additional and/or alternate information regarding categories, terms, and/or search phrases which were used as parameters in a search of audio files. In some implementations, one or more components may be absent from call information area 1310.

Filter area 1305 may list one or more filters that have been utilized to filter one or more aspects of the search result from being included in word cloud 1320. In the illustrated example, a filter is set to display a word cloud where each set of words in word cloud 1320 represents a category. In some implementations, a filter may be activated which categorizes and displays phrases based on groups of search terms and/or specific phrases. For example, a filter may be activated which displays phrases and each phrase corresponds to a term contained within a specific category.

Graph selection area 1315 may display thumbnail versions of one or more additional and/or alternative displays for search result information. In some implementations, individual images in graph selection area may be smaller versions of more search result interfaces illustrated in FIGS. 12 through 15 and described herein. In one or more implementations, additional or alternative display options may be displayed in graph selection area 1315, such as a pie graph. In some implementations, one or more images in graph selection area 1315 may be clickable and when activated, may direct the user to one or more additional and/or alternate display pages which may share one or more characteristics with the displays illustrated in FIGS. 12 through 15 and described herein.

Figure 14:
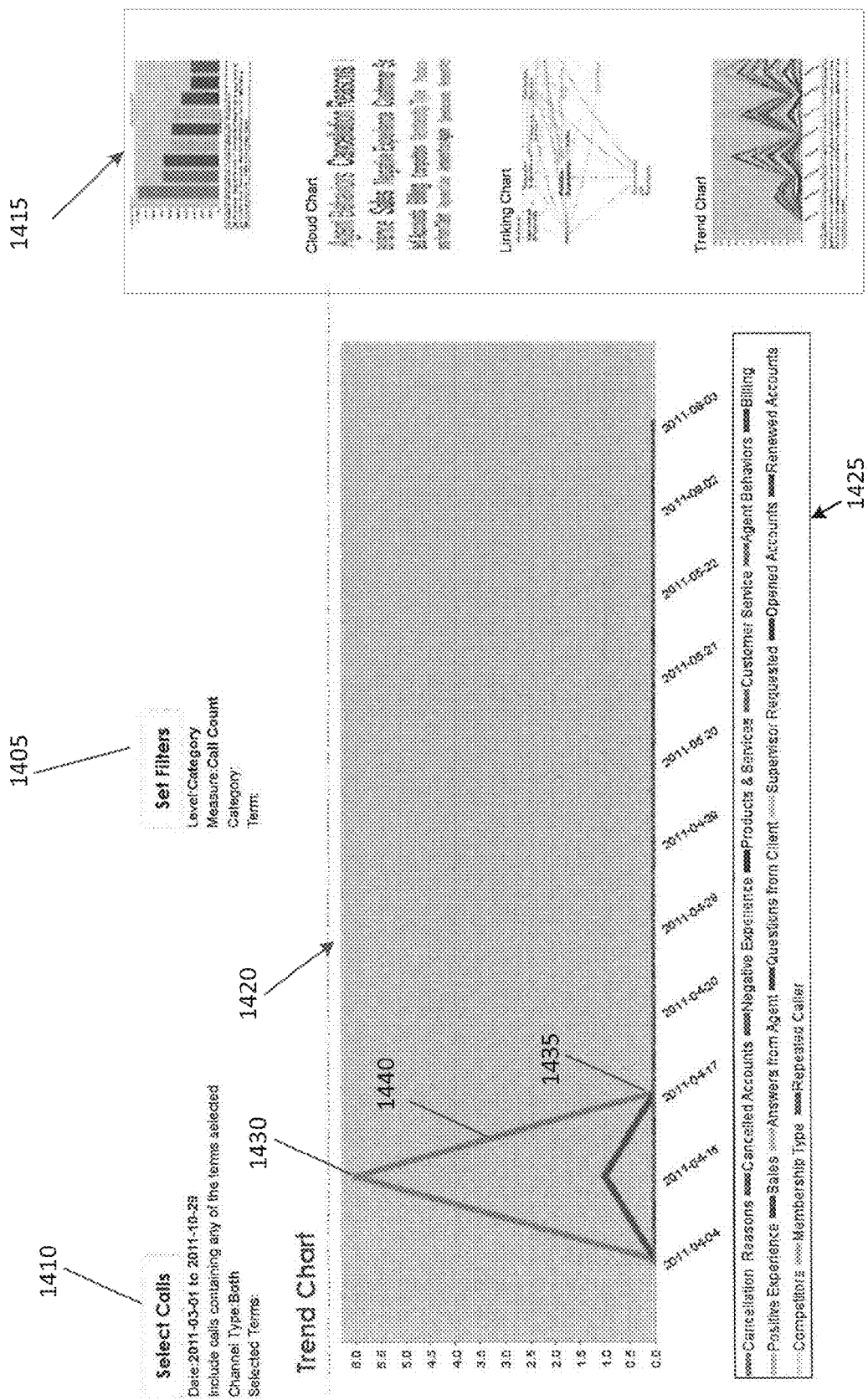
FIG. 14 illustrates an example graphical user interface for a trend graph to display information regarding the presence of phrases in audio files which may be implemented in an embodiment of an audio file search engine.

Referring to FIG. 14, aspects of an example trend graph graphical user interface to display information regarding the presence of particular search phrase categories in multiple audio files which may be implemented in an embodiment of an audio file search engine is illustrated. For convenience, aspects of FIG. 14 will be described with reference to a system of one graphical interface. In some implementations, the graphical interface displaying the graphical user interface of FIG. 14 may share one or more aspects with workstation 270 as illustrated in FIG. 2 and described herein. The graphical user interface of FIG. 14 may be generated by a system which may share one or more characteristics and/or may include one or more components of the systems illustrated in FIGS. 1 and 2.

Trend chart 1420 may represent results from an audio file search utilizing one or more phrases. In trend chart 1420, the x-axis may represent a time interval. For example, the x-axis of trend chart 1420 displays a series of dates corresponding to the dates when audio files were initially recorded. In the illustrated trend chart 1420, the y-axis displays the number of calls where a search identified one or more phrases associated with a category. Trend line 1440 connects points on trend chart 1420 where results from searches using the same search phrases on different sets of audio files are plotted. For example, data point 1430 represents the result of a search conducted on audio files from Apr. 15, 2011, for phrases associated with "Cancellation Reasons," which resulted in identifying phrases in six audio files. Data point 1435 represents the result of a search conducted on audio files from Apr. 17, 2011, for phrases associated with the same category, which resulted in identifying phrases in zero audio files. Trend line 1440 connects the data point 1430 and the data point 1435. In some implementations, lines of differentiating color may represent search results from multiple categories on the same date range of audio files. In the illustrated interface, two trend lines of differing shades are displayed on trend chart 1420, each representing a category. The coloring of lines on trend chart 1422 may correspond to one or more labels illustrated in legend 1425. In some implementations, legend 1425 may associate trend chart colors with one or more categories, terms, sets of phrases, and/or search phrases.

In some implementations, trend chart 1420 may be utilized to represent confidence levels of identified matches to key phrases in one or more audio files. For example, the y-axis may be a measurement of confidence levels that a phrase was found in a search. As described herein, the confidence level may take into account one or more identified characteristics such as, for example, associated costs, customer account information, and/or emotion recognition data. In some implementations, one or more audio files may be investigated for a set of phrases and data points on the graph may represent confidence levels that one or more phrase in the set are located in the investigated audio files from the corresponding time period. Additionally or alternatively, data points may represent the results of searches based on a category of phrases where the coordinates of data points may represent the likelihood that one or more of the phrases associated with the category are present in audio files recorded at a corresponding time. In some implementations, each data point may represent a cost for a given set of categories or phrases. For example, a trend chart representing "Account Cancellation" may include a sum of the costs associated with all matches to the terms in the category, such as "Too expensive," "Do not like billing system," and/or "Do not like the service."

For each corresponding time on the x-axis, the likelihood that the phrase represented by a particular line was represented in one or more audio files recorded at the corresponding time may be plotted. In some implementations, one or more audio files may be investigated for particular set of key phrases and the corresponding plots may represent an aggregate confidence level of the presence of the corresponding phrase in the set of audio files. Additionally or alternatively, each line may represent a category of phrases and the plot for each time period may represent the likelihood that one or more phrases associated with the respective category is present in one or more of the investigated audio files at the corresponding time or time interval.

Call information area 1410 may display one or more pertinent characteristics of audio files used in a phrase search. In the illustrated interface, call information area 1410 includes a set of dates which may represent a time interval from which all audio files contained in a search were initially recorded. Channel type may describe the particular voice stream from an audio file which was utilized during a phrase search. For example a phone call between two callers may contain two channels: one for each speaker in the call. The user may select one or more channels contained in an audio file be used in a search with given key phrases. In some implementations, call information area 1410 may contain additional information regarding categories, terms, and/or search phrases which were used as parameters in a search of audio files. In some implementations, one or more components may be absent from call information area 1410 and/or additional components may be present.

Filter area 1405 may list one or more filters that have been utilized to filter one or more aspects of a search result from being included in trend chart 1420. In the illustrated example, a filter is set to display a trend chart where each line represents a category. In some implementations, a filter may be activated which categorizes and displays phrases based on term groups of search terms and/or specific phrases as previously described. For example, a filter may be activated which displays search results where each line corresponds to a term contained within a specific category.

Graph selection area 1415 may display thumbnail versions of one or more additional and/or alternative displays for search result information. In some implementations, individual images in graph selection area may be smaller versions of more search result interfaces illustrated in FIGS. 12 through 15 and described herein. In one or more implementations, additional or alternative display options may be displayed in graph selection area 1415, such as a pie graph. In some implementations, one or more images in graph selection area 1415 may be clickable and when activated, may direct the user to one or more additional and/or alternate display pages which may share one or more characteristics with the displays illustrated in FIGS. 12 through 15 and described herein.

In some embodiments, the bar graph 1220, the word cloud 1320, the trend chart 1420 may additionally and/or include emotion recognition information related to identifications in one or more audio files of a likely emotional quality of the voice of a speaker. In some implementations, a displayed confidence level displayed on a graph may be partially based on the likelihood that the speaker is experiencing the particular emotion. In some implementations, one or more markings on a graph may represent a particular emotion and the magnitude associated with the marking may represent the confidence level of the emotion. For example, a bar graph may represent categories of search phrases that were utilized in a search of a set of audio files. Each bar in the graph may represent an emotion, such as "Anger," "Impatience," and/or "Content." The height of bars in the bar graph may represent the number of calls00 where each emotion was identified, the likelihood that one or more emotions was identified in the set of audio files, and/or a cost associated with identified emotions. In some implementations, emotion recognition data may be represented on bar graph 1220, word cloud 1320, and/or trend chart 1420 with a different indication than the other displayed data such as, confidence level and/or cost measurements with set of phrases. For example, a word cloud may represent the number of calls with phrase matches associated with a category as previously described. The color of the words may correspond to one or more emotions, so that both confidence levels and emotions may be represented in the same graphic. The set of words "I would like to cancel my account" may be displayed in red, which may indicate that it is most likely that the caller is experiencing anger. The set of words "Upgrade my account" may be displayed in green, which may indicate that the speaker is experiencing satisfaction. The font size of the words may continue to represent the number of calls which matched each term.

Figure 15:
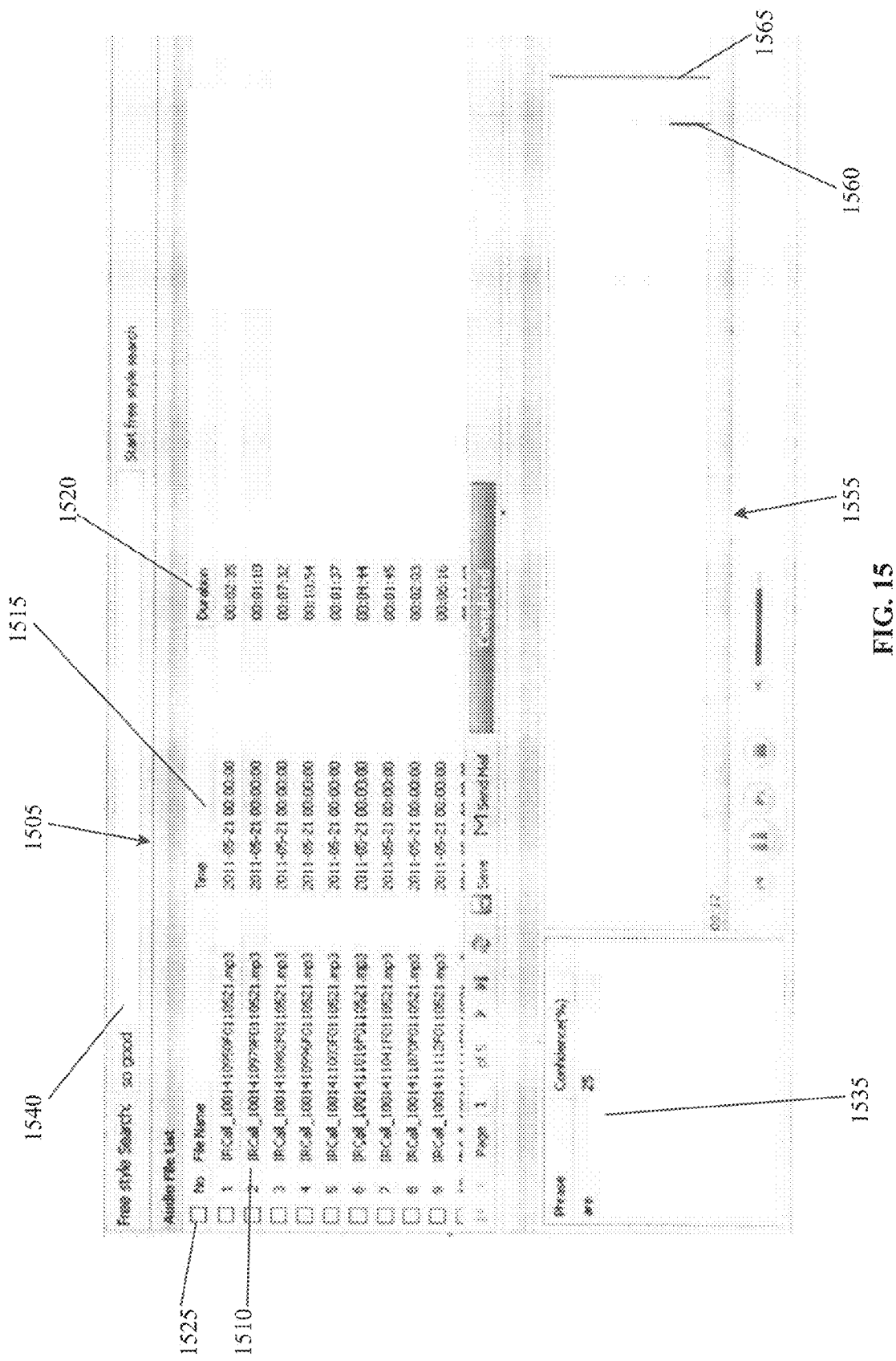
FIG. 15 illustrates aspects of an example graphical user interface for displaying audio file results information regarding audio files that contain one or more phrases which may be implemented in an embodiment of an audio file search engine.

Referring to FIG. 15, aspects of an example audio file results graphical user interface display information regarding audio files that contain one or more identified key phrases which may be implemented in an embodiment of an audio file search engine is illustrated. For convenience, aspects of FIG. 15 will be described with reference to a system of one graphical interface. In some implementations, the graphical interface displaying the graphical user interface of FIG. 15 may share one or more aspects with workstation 270 as illustrated in FIG. 2 and described herein. The graphical user interface of FIG. 15 may be generated by a system which may share one or more characteristics and/or may include one or more components of the systems illustrated in FIGS. 1 and 2.

Audio file list 1505 may include a listing of one or more audio files which were returned as a result of an audio file search. In some implementations, audio file list 1505 may be populated based on processes which share one or more steps and/or components with one or more methods as previously described and illustrated in FIGS. 2 through 7. For example, a notification transmitted at step 430 of FIG. 4 and/or step 630 of FIG. 6 may trigger the population of audio file list 1505. Additionally, for example, the event triggered at step 750 of FIG. 7 may include populating audio file list 1505.

Entries in audio file list 1505 may include a filename 1510, a time where a key phrase was located in an audio file 1515, and a duration of an audio file 1520. In some implementations, one or more entries in audio file list 1505 may not include one of these characteristics and/or may include additional characteristics. Additionally, the illustrated audio file entries include a checkmark box 1525. Checkmark box 1525 may be activated by a user to select one or more entries for further analysis. For example, a user may activate checkmark box 1525 for two files listed in audio file list 1505. After activating those two entries, a user may elect to save the contents of those files for later analysis.

Free style search box 1540 may allow a user to create a new search phrase. Free style search box 1540 may be utilized to enter a search phrase without accessing additional graphical user interfaces, such as the interfaces illustrated in FIGS. 12 through 14. A phrase entered into freestyle search box 1540 may be used as a search phrase in one or more audio files. In some implementations, a phrase in freestyle search box 1540 may be used on a listing of files in audio file list 1505, entries in audio file list 1505 where respective checkboxes 1525 have been selected, and/or one or more alternate collections of audio files.

Confidence level box 1535 may display a confidence level which has been associated with one or more search terms. As described herein, the confidence level may take into account one or more identified characteristics such as, for example, associated costs, customer account information, and/or emotion recognition data. Additionally or alternatively, entries in confidence level box 1535 may be editable to allow a user to vary a confidence level with a particular word or phrase. In some implementations, confidence levels displayed in confidence level box 1535 may be based on results from a key phrase search of one or more audio files. In other implementations, confidence level box 1535 may be utilized by user to associate a particular confidence level with a search phrase. For example, a user may prefer to see all audio files in a set which contain the phrase "I'd like to cancel my account." The user may utilize confidence level box 1535 to set a low confidence level for that phrase. By lowering the confidence level, the search may return more results than what would have been returned with a higher confidence level, but the search is less likely to miss instances of the phrase.

Audio file visualization box 1555 may be used to display one or more aspects of an audio file. In some implementations, a visual representation of audio waves representing the audio file may be displayed in audio file visualization box 1555. The x-axis of audio visualization box 1555 may represent a time interval in order to display one or more time periods of an audio file. For example, the left boundary of audio visualization box 1555 may represent the start of an audio file. Progression to the right of the audio visualization box 1555 may represent the progression of time in the displayed audio file. Additionally or alternatively, audio file visualization box 1555 may display one or more indications of potential matches to a given key phrase based on results of a key phrase search of an audio file. Bar 1560 and bar 1565 may be representations of locations in an audio file where matches have been located. Height of bar 1560 and 1565 may be representative of confidence levels that potential matches at positions in an audio file correspond to one or more search phrases. In some implementations, additional buttons may allow a user to playback an audio file recording, locate specific time periods in an audio file, and/or alter one or more aspects of an audio file. For example, the user may click on a bar in audio visualization box 1555 and may be provided with audio playback of the audio file at that time. The user may then audibly inspect the file to better determine whether the position in the audio file is a match to a given key phrase. In some implementations, audio visualization box 1555 may display an audio file listed in audio file list 1505. A user may indicate a particular file to inspect, and audio visualization box 1555 may be populated with the audio file of interest.

In some implementations, search result information displayed in audio visualization box 1555 may be the result of using a single phrase to perform a search. In some implementations, the display may include identified matches to multiple phrases. For example, an audio file may be searched for all phrases associated with the category "Cancellation Reasons." The displayed search results in audio visualization box 1555 may have bars representing identified matches to any phrase in the category. Bars may be differentiated based on the particular identified phrase in a set of search phrases, such as color differences and/or labels on the bars. In some implementations, a user may click on a bar in audio visualization box 1555 and be directed to a display of data associated with the phrase that was represented by the bar. For example, clicking on a bar may direct a user to a display that lists the phrase that was identified, the cost associated with the phrase, the confidence level of the identification, and/or an audio clip at the time where the phrase was identified in the audio file.

Figure 15A:
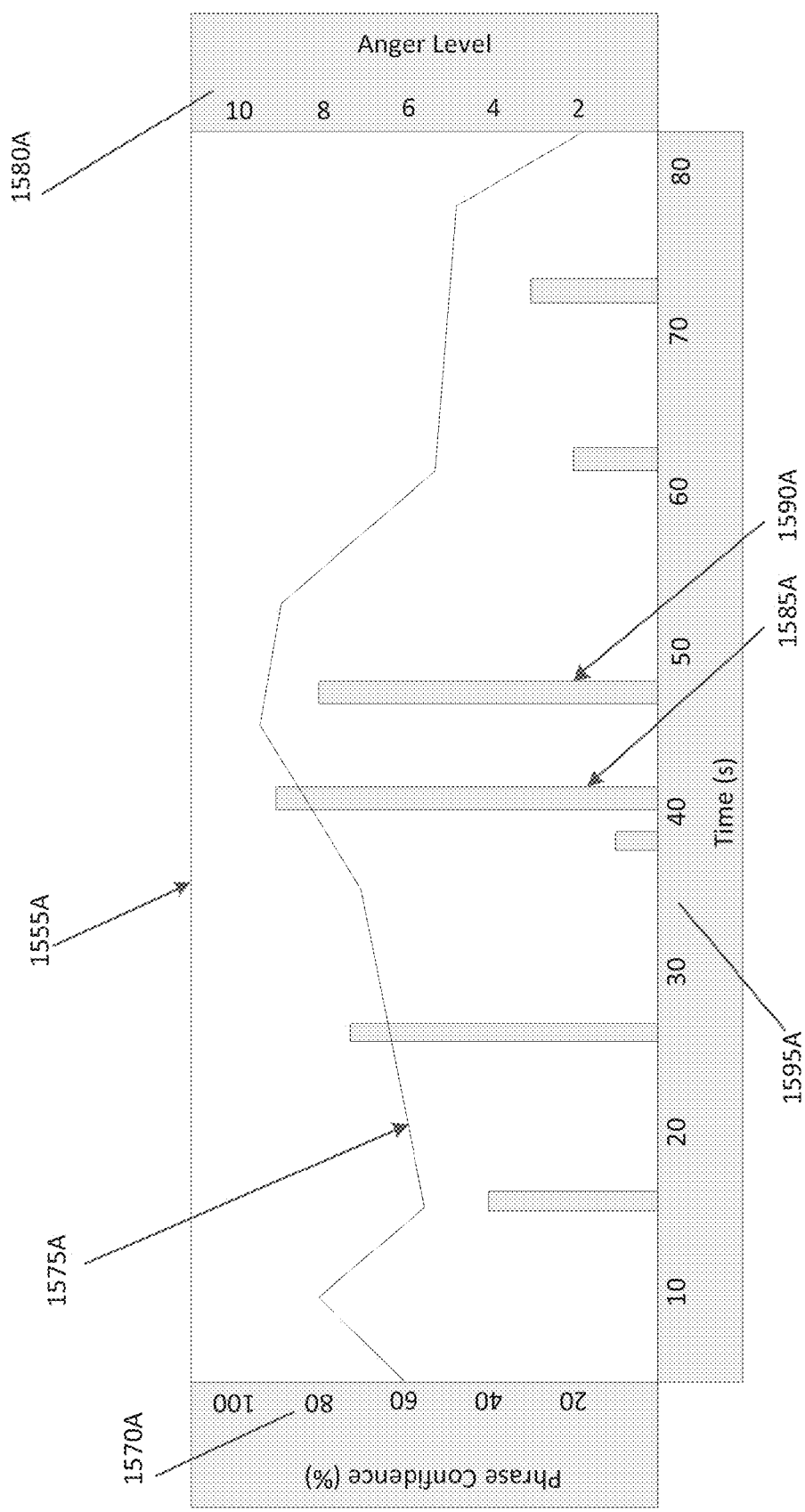
FIG. 15A is an example of an audio visualization box from an example graphical user interface for displaying audio search results.

Referring to FIG. 15A, an example of an audio visualization box from an example graphical user interface for displaying audio search results is illustrated. Audio visualization box 1555A may share one or more characteristics with audio visualization box 1555. In the illustrated example, audio visualization box 1555A displays phrase search results for an audio file. Time axis 1595A is marked in increments of 10 seconds and may represent the time in a displayed audio file as previously described. In some implementations, time axis 1595A may be marked with different time intervals and/or in different units. Phrase confidence axis 1570A is marked as percent confidence that identified phrases in the displayed audio file search results match key phrases. Anger level axis 1580A measures the likely emotion of the speaker on the displayed audio file based on a scale from 1 to 10. In some implementations, axes may be marked in different units and/or on different scales. For example, phrase confidence axis 1570A may be marked in decimal values, anger level axis 1580A may be marked based on one or more different emotions, and/or emotion data may be presented based on a confidence level of the identified emotion.

Bars in audio visualization box 1555A may represent instances in an audio file where a phrase search identified a phrase at a corresponding time. The height of a bar may represent a value on phrase confidence axis 1570A. For example, bar 1585A is positioned at the 40-second mark on time axis 1595A and has a height of 90% on phrase confidence axis 1570A, which corresponds to an identified phrase 40 seconds into the audio file with 90% confidence that the phrase is present at that time. As another example, bar 1590A displays an identified phrase at the 48-second mark with a height of 80% on confidence axis 1570A. In some implementations, bars in audio visualization box 1555A may not be present and/or additional bars may be included which represent one or more alternate of identifications in an audio file, such as emotion and/or cost.

Emotion line 1575A represents an identified emotion of a speaker in an audio file on a scale from 1 to 10. In the illustrated example, emotion line 1575A is a plot of an identified level of anger of a speaker. One or more additional and/or alternate lines may be present to represent additional emotions on the same graph. For example, a second line in audio visualization box 1555A may represent instances where "impatience" is identified in the voice of a speaker. An emotion line 1575A may be constructed by connecting data points where emotion is detected in the audio file. For example, a search may identify an anger level of 8 at the 10-second mark, followed by a level of 6 at the 15-second mark. The line between these points may show a trend that the speaker is less angry as the audio file progresses. In some implementations, emotion line 1575A may be represented by a curved line based on a mathematical fit to the identified data points, such as a least squares fit.

In some implementations, a user may initiate one or more actions based on interacting with one or more elements of audio visualization box 1555A. For example, a user may click on bar 1585A and the audio surrounding that identified instance may be played so that the user may independently verify that the search phrase is present. In some implementations, clicking a position in an audio file may display additional information, such as a text transcript of the audio file, the identified emotion of the speaker, and/or information about the phrase identified at the time that was clicked. For example, audio visualization box 1555A may display information regarding a category of phrases that were used in an audio search. By clicking on a bar, the user may be directed to a display which lists the phrase that was spoken at that time, the cost associated with that phrase, the confidence level of the match, and/or information regarding the customer who was speaking, such as account number, address, and/or account details.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer implemented method of analyzing content originating from an audio source, comprising:
   identifying an audio file, wherein said audio file is representative of spoken content of at least one speaker;
   identifying a key phrase, wherein said key phrase includes one or more words of interest;
   identifying a cost, wherein said cost is based on a value of either the presence of or the absence of said key phrase in said audio file;
   identifying a candidate phrase in said audio file, wherein said candidate phrase is representative of one or more words spoken by said at least one speaker and present in said audio file;
   associating a confidence level with said candidate phrase, wherein said confidence level is based on a probability that said candidate phrase matches said key phrase;
   identifying a threshold confidence level;

determining whether said confidence level satisfies said threshold confidence level;

providing a notification when said confidence level satisfies said threshold confidence level, said notification providing an indication of the presence of said key phrase in said audio file;

wherein the providing of said notification is at least partially based on said cost; and identifying a cost adjusting characteristic of said audio file; and determining an adjusted cost, wherein said adjusted cost is an alteration of said cost and is based on determining said confidence level satisfies said threshold confidence level and identifying said cost adjusting characteristic of said audio file.

2. The method of claim 1, further comprising the step of identifying a cost threshold, and wherein said notification is only provided when said cost satisfies said cost threshold.

3. The method of claim 1, wherein said notification includes a candidate phrase location, wherein said candidate phrase location is indicative of a time in said audio file segment where said candidate phrase is located.

4. The method of claim 1, further comprising the step of analyzing a second audio file for the presence of said key phrase utilizing said adjusted cost.

5. The method of claim 1, wherein said cost adjusting characteristic is at least one of a customer importance level associated with said audio file, a customer service representative flag associated with said audio file, and a frequency of said key phrase in said audio file.

6. The method of claim 1, wherein said at least one speaker includes a customer and a customer service representative, and wherein said audio file segment is indicative of a phone conversation between said customer and said customer service representative.

7. The method of claim 1, wherein said method is executed on at least one central processor and at least one distributed processor.

8. The method of claim 7, further comprising the steps of:
identifying, by said central processor, an audio file segment, wherein said audio file segment is a smaller portion of said audio file; and
providing said audio file segment to said distributed processor to perform at least the step of identifying said candidate phrase in said audio file.

9. The method of claim 8, further comprising the steps of:
determining a computing load value necessary to achieve analysis of said audio file segment in real time; and
selecting a number of processors to utilize based on said computed load value.

10. The method of claim 1, wherein said notification is only provided when said cost satisfies a cost threshold.

11. The method of claim 1, wherein at least one of said confidence level and said threshold confidence level is based on said cost.

12. The method of claim 1, wherein said notification provides an indication of said cost of said key phrase.

13. A computer implemented method of analyzing content originating from an audio source, comprising:
receiving an audio file, wherein said audio file is representative of spoken content of at least one speaker;
identifying a key phrase, wherein said key phrase includes one or more words which a user has interest in identifying in said audio file;
receiving a cost, wherein said cost is indicative of a value of either the presence of or the absence of said key phrase in said audio file;
identifying a candidate phrase in said audio file, wherein said candidate phrase is representative of one or more words spoken by said at least one speaker in said audio file and is a likely match for said key phrase;
identifying a threshold cost value;
determining whether said cost satisfies said threshold cost value;
providing a notification when said cost satisfies said threshold cost value, said notification providing an indication of the presence of said key phrase in said audio file; and
identifying a cost adjusting characteristic of said audio file; and
determining an adjusted cost, wherein said adjusted cost is an alteration of said cost and is based on determining said confidence level satisfies said threshold confidence level and identifying said cost adjusting characteristic of said audio file.

14. The method of claim 13, wherein said cost is determined based on actual costs stemming from one or more previous audio files containing said key phrase.

15. The method of claim 13, wherein said cost is determined based on one or more costs associated with text files containing said key phrase.

16. The method of claim 13, wherein said notification provides an indication of said cost of said key phrase.

17. The method of claim 13, wherein said notification is provided when said cost satisfies said threshold cost value and when a measure of likelihood of match between said key phrase and said candidate phrase satisfies a threshold confidence level.

18. A system, comprising:
a first analysis processor, said first analysis processor operable to execute instructions stored in memory, comprising instructions to:
receive a first audio file segment, wherein said first audio file segment is representative of spoken content of at least one speaker;
receive a key phrase, wherein said key phrase includes one or more words of interest;
identify a cost, wherein said cost is based on a value of either the presence of or the absence of said key phrase in an audio source;
identify a first candidate phrase in said audio file segment, wherein said first candidate phrase is representative of one or more words spoken by said at least one speaker and present in said audio file segment;
associate a first confidence level with said first candidate phrase, wherein said first confidence level is based on a probability that said first candidate phrase matches said key phrase;
identifying a first threshold confidence level;
determine whether said first confidence level satisfies said threshold confidence level;
provide a first notification when said first confidence level satisfies said first threshold confidence level, said first notification providing an indication of the presence of said key phrase in said audio file;
wherein the providing of said first notification is at least partially based on said cost; and
identify a cost adjusting characteristic of said audio file; and
determine an adjusted cost, wherein said adjusted cost is an alteration of said cost and is based on determining said confidence level satisfies said threshold confidence level and identifying said cost adjusting characteristic of said audio file.

19. The system of claim 18, further comprising:
a second analysis processor, said second analysis processor operable to execute instructions stored in memory, comprising instructions to:
- receive a second audio file segment, wherein said second audio file segment is representative of spoken content of at least one speaker;
- receive a key phrase, wherein said key phrase includes one or more words of interest;
- identify a cost, wherein said cost is based on a value of either the presence of or the absence of said key phrase in an audio source;
- identify a second candidate phrase in said audio file segment, wherein said second candidate phrase is representative of one or more words spoken by said at least one speaker and present in said audio file segment;
- associate a second confidence level with said second candidate phrase, wherein said second confidence level is based on a probability that said second candidate phrase matches said key phrase;
- identifying a second threshold confidence level;
- determine whether said second confidence level satisfies said threshold confidence level; and
- provide a second notification when said second confidence level satisfies said second threshold confidence level, said second notification providing an indication of the presence of said key phrase in said audio file;
- wherein the providing of said second notification is at least partially based on said cost.

20. The system of claim 19, further comprising a central processor, said central processor operable to execute instructions stored in memory, comprising instructions to:
- activate said first analysis processor and said second analysis processor based on a load value.

21. The system of claim 20, wherein said load value is based on density of a data stream from which said first audio file segment and said second audio file segment originated.

22. A computer implemented method of analyzing content originating from an audio source, comprising:
- identifying an audio file, wherein said audio file is representative of spoken content of at least one speaker;
- identifying a key phrase, wherein said key phrase includes one or more words of interest;
- identifying a cost, wherein said cost is based on a value of either the presence of or the absence of said key phrase in said audio file;
- identifying a candidate phrase in said audio file, wherein said candidate phrase is representative of one or more words spoken by said at least one speaker and present in said audio file;
- associating a confidence level with said candidate phrase, wherein said confidence level is based on a probability that said candidate phrase matches said key phrase;
- identifying a threshold confidence level;
- determining whether said confidence level satisfies said threshold confidence level;
- providing a notification when said confidence level satisfies said threshold confidence level, said notification providing an indication of the presence of said key phrase in said audio file;
- identifying a cost adjusting characteristic of said audio file; and
- determining an adjusted cost, wherein said adjusted cost is an alteration of said cost and is based on determining said confidence level satisfies said threshold confidence level and identifying said cost adjusting characteristic of said audio file
- wherein the providing of said notification is at least partially based on said adjusted cost.

\* \* \* \* \*